(12) United States Patent
Matsuzaki et al.

(10) Patent No.: US 10,815,387 B2
(45) Date of Patent: *Oct. 27, 2020

(54) AQUEOUS INK JET INK COMPOSITION, INK JET RECORDING METHOD, AND INK JET RECORDING APPARATUS

(71) Applicant: Seiko Epson Corporation, Tokyo (JP)

(72) Inventors: Akiko Matsuzaki, Matsumoto (JP); Mitsuaki Kosaka, Minowa (JP)

(73) Assignee: Seiko Epson Corporation (JP)

( * ) Notice: Subject to any disclaimer, the term of this patent is extended or adjusted under 35 U.S.C. 154(b) by 233 days.

This patent is subject to a terminal disclaimer.

(21) Appl. No.: 15/888,240

(22) Filed: Feb. 5, 2018

(65) Prior Publication Data

US 2018/0265727 A1    Sep. 20, 2018

(30) Foreign Application Priority Data

Mar. 17, 2017 (JP) .................................. 2017-052568
Apr. 12, 2017 (JP) ................................. 2017-078680

(51) Int. Cl.
| | |
|---|---|
| *C09D 11/52* | (2014.01) |
| *C09D 11/322* | (2014.01) |
| *B41J 2/04* | (2006.01) |
| *C09D 11/107* | (2014.01) |
| *C09D 11/037* | (2014.01) |
| *C09D 11/106* | (2014.01) |
| *C09D 11/10* | (2014.01) |

(52) U.S. Cl.
CPC ................. *C09D 11/52* (2013.01); *B41J 2/04* (2013.01); *C09D 11/037* (2013.01); *C09D 11/10* (2013.01); *C09D 11/106* (2013.01); *C09D 11/107* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 6,375,728 B2 | 4/2002 | Yamashita et al. | |
| 7,427,130 B2 | 9/2008 | Furukawa et al. | |
| 10,384,469 B2 * | 8/2019 | Kagata | B41J 2/17566 |
| 10,434,808 B2 * | 10/2019 | Matsuzaki | C09D 11/40 |
| 10,457,073 B2 * | 10/2019 | Okuda | B41M 5/0017 |
| 2002/0002930 A1 | 1/2002 | Yamashita et al. | |
| 2006/0057339 A1 | 3/2006 | Adachi et al. | |
| 2006/0061643 A1 | 3/2006 | Furukawa et al. | |
| 2009/0142552 A1 | 6/2009 | Craamer et al. | |
| 2009/0211490 A1 * | 8/2009 | Ikuno | B41M 5/52 106/31.92 |

(Continued)

FOREIGN PATENT DOCUMENTS

| | | |
|---|---|---|
| JP | H11-228898 A | 8/1999 |
| JP | 2004-299386 A | 10/2004 |

(Continued)

*Primary Examiner* — Helene Klemanski
(74) *Attorney, Agent, or Firm* — Harness, Dickey & Pierce, P.L.C.

(57) ABSTRACT

The aqueous ink jet ink composition contains a pigment dispersion formed of a surface-treated pigment having a phosphorus-containing group on a surface thereof and a resin dispersion, in which a conductivity of the ink composition is 2600 μs/cm or less.

18 Claims, 1 Drawing Sheet

(56) References Cited

U.S. PATENT DOCUMENTS

| | | | |
|---|---|---|---|
| 2010/0175585 A1* | 7/2010 | Liu | C09B 67/0009 |
| | | | 106/31.76 |
| 2011/0292117 A1 | 12/2011 | Goto et al. | |
| 2012/0308786 A1 | 12/2012 | Shioda et al. | |
| 2013/0083116 A1* | 4/2013 | Fukaya | C09D 11/324 |
| | | | 347/20 |
| 2014/0055520 A1 | 2/2014 | Inumaru et al. | |
| 2014/0132661 A1 | 5/2014 | Inumaru et al. | |
| 2016/0303873 A1* | 10/2016 | Okuda | B41M 5/0017 |
| 2016/0376452 A1* | 12/2016 | Sugita | C09D 11/36 |
| | | | 347/100 |
| 2018/0030298 A1* | 2/2018 | Yamazaki | B41J 2/01 |
| 2018/0282564 A1* | 10/2018 | Matsuzaki | C09D 11/38 |

FOREIGN PATENT DOCUMENTS

| | | |
|---|---|---|
| JP | 2005-138502 A | 6/2005 |
| JP | 2006-083277 A | 3/2006 |
| JP | 2006-264185 A | 10/2006 |
| JP | 4956666 B | 6/2012 |
| JP | 5480446 B | 4/2014 |
| JP | 5489126 B | 5/2014 |
| JP | 5750838 B | 7/2015 |
| JP | 2015-227003 A | 12/2015 |
| JP | 5828784 B | 12/2015 |
| JP | 5834110 B1 | 12/2015 |
| WO | WO 2016/152580 A1 * | 9/2016 |
| WO | 2017-013983 A1 | 1/2017 |

* cited by examiner

AQUEOUS INK JET INK COMPOSITION, INK JET RECORDING METHOD, AND INK JET RECORDING APPARATUS

BACKGROUND

1. Technical Field

The present invention relates to an aqueous ink jet ink composition, an ink jet recording method, and an ink jet recording apparatus.

2. Related Art

An ink jet recording method for ejecting minute ink droplets from a nozzle of a recording head of an ink jet recording apparatus to record an image on a recording medium is known and the use thereof in the fields of sign printing and high-speed label printing is also being researched. In a case where an image is recorded on a recording medium with a low ink absorbing property (for example, art paper or coated paper) or a recording medium with an ink non-absorbing property (for example, a plastic film), the use of an aqueous resin ink composition containing resin emulsion (below referred to as "an aqueous ink" or "an ink") as ink is being researched from the viewpoints of the global environment, safety for human bodies, and the like. Then, when recording on a recording medium with a low ink (non) absorbing property using an aqueous resin ink composition, a reaction liquid containing an aggregating agent for ink may be used in order to fix the ink at an early stage and improve the image quality without increasing the primary heating temperature after recording.

Here, pigments may be used as a coloring material since pigments have a property of being resistant to discoloration caused by light, gas, and the like. In the ink jet recording using this pigment ink, the problems are how to improve permeability of the ink to the recording medium and affinity with the recording medium, to suppress unintentional bleeding and spreading of the ink on the recording medium, and to record fine lines cleanly. Therefore, in order to obtain an ink composition which is excellent in storage stability, does not easily bleed, and has good fixing properties on paper, and with which a clear image can be printed, a technique is known in which a pigment having a surface modified with a phosphorus-containing group is used (refer to, for example, Japanese Patent No. 5489126).

However, with a pigment having a surface modified with a phosphorus-containing group, it is necessary to pay attention to the storage stability of the ink and the storage stability is not sufficient in the above technique.

SUMMARY

An advantage of some aspects of the invention is to provide an aqueous ink jet ink composition excellent in storage stability while securing printing quality during fine line printing, an ink jet recording method, and an ink jet recording apparatus.

The invention can be realized in the following aspects or application examples.

Application Example 1

According to an aspect of the invention, there is provided an aqueous ink jet ink composition, including a pigment dispersion formed of a surface-treated pigment having a phosphorus-containing group on a surface thereof, and a resin dispersion, in which the ink composition has a conductivity of 2600 μs/cm or less.

According to the application example described above, it is possible to provide an aqueous ink jet ink composition having excellent storage stability while securing printing quality during fine line printing due to the conductivity of the ink composition being 2600 μs/cm or less.

Application Example 2

In the application example described above, the phosphorus-containing group may include either a P—O group or a P═O group.

According to the application example described above, including either the P—O group or the P═O group as the phosphorus-containing group makes it possible to obtain an aqueous ink jet ink composition having excellent storage stability while securing printing quality during fine line printing.

Application Example 3

In the application example described above, the conductivity may be 1000 μs/cm or more and 2000 μs/cm or less.

According to the application example described above, the conductivity being 1000 μs/cm or more and 2000 μs/cm or less makes it possible to obtain an aqueous ink jet ink composition having better storage stability.

Application Example 4

In the application example described above, 5% by mass or less of an organic solvent having a standard boiling point of 280° C. or higher may be provided.

According to the application example described above, since the drying property of the ink composition on the recording medium is increased due to the content of the organic solvent having a standard boiling point of 280° C. or higher being 5% by mass or less, it is possible to suppress the generation of bleeding and to form an image with excellent image quality.

Application Example 5

In the application example described above, a solid content of the resin dispersion may be 1% by mass or more and 15% by mass or less.

According to the application example described above, the solid content of the resin dispersion being 1% by mass or more and 15% by mass or less makes it possible to secure ejection reliability at the time of recording and form an image excellent in abrasion resistance.

Application Example 6

In the application example described above, the content of the surface-treated pigment may be 0.5% by mass or more and 10% by mass or less.

According to the application example described above, the content of the surface-treated pigment being 0.5% by mass or more and 10% by mass or less makes it possible to secure ejection reliability at the time of recording and to form an image excellent in abrasion resistance.

Application Example 7

According to another aspect of the invention, there is provided an ink jet recording method, including attaching the aqueous ink jet ink composition according to any one of Application Examples 1 to 6 to a recording medium by ejecting the aqueous ink jet ink composition from an ink jet head.

According to the application example described above, setting the conductivity of the ink within the predetermined range makes the dispersion stability of the ink component excellent, and thus it is possible to provide a recording method excellent in ejection stability. In addition, since the ink permeability to a recording medium and the affinity with a recording medium are good, unintentional bleeding and spreading of ink on the recording medium is suppressed, printing quality during fine line printing is secured, and it is also possible to obtain an image excellent in abrasion resistance.

Application Example 8

In the application example described above, attaching a reaction liquid including an aggregating agent for aggregating components of the aqueous ink jet ink composition to the recording medium may be provided.

According to the application example described above, attaching a reaction liquid including an aggregating agent for aggregating the components of the ink composition to the recording medium makes it possible to suppress bleeding of ink to perform recording with excellent image quality.

Application Example 9

In the application example described above, heating the recording medium may be provided, in which the attaching of the aqueous ink jet ink composition is performed on the recording medium heated by the heating.

According to the application example described above, performing the attaching of the aqueous ink jet ink composition on the recording medium heated by the heating makes it possible to suppress bleeding of the ink to perform recording with excellent image quality and to form an image with better abrasion resistance, and also makes it possible to provide an ink jet recording method excellent in ejection stability even in a case where there is heating.

Application Example 10

In the application example described above, in the attaching of the aqueous ink jet ink composition, a surface temperature of the recording medium may be 30° C. or higher and 55° C. or lower.

According to the application example described above, even in a case where the surface temperature of the recording medium is 30° C. or higher and 55° C. or lower in the attaching of the aqueous ink jet ink composition, it is possible to improve the image quality while suppressing the influence of heat on the ink jet head, to form an image excellent in abrasion resistance, and to provide an ink jet recording method excellent in ejection stability.

Application Example 11

In the application example described above, the attaching of the aqueous ink jet ink composition may be performed in which scanning is performed a plurality of times for attaching the ink composition to the recording medium by ejecting the aqueous ink jet ink composition from the ink jet head while the ink jet head changes position relative to the recording medium, and a scanning time for one scan may be 12 s or shorter.

According to the application example described above, it is possible to form an image excellent in abrasion resistance even with the scanning time as described above and to provide an ink jet recording method excellent in ejection stability.

Application Example 12

In the application example described above, an absolute value of a difference in surface tension between the aqueous ink jet ink composition and the reaction liquid may be 10 or less.

According to the application example described above, since the wettability at the time of recording is secured by the absolute value of the difference in surface tension between the aqueous ink jet ink composition and the reaction liquid being 10 or less, it is possible to perform recording excellent in image quality.

Application Example 13

In the application example described above, the reaction liquid may contain 5% by mass or less of a water-soluble organic solvent having a standard boiling point of higher than 280° C.

According to the application example described above, the drying property of the reaction liquid on the recording medium is increased due to the reaction liquid having a content of an organic solvent having a standard boiling point of 280° C. or higher of 5% by mass or less.

Application Example 14

In the application example described above, the ink jet head may have a step portion in a flow path through which the aqueous ink jet ink composition passes between a pressure chamber and a nozzle.

According to the application example described above, for example, when the nozzle is formed by etching a nozzle plate (silicon layer), a step portion is formed in the flow path through which ink passes between the pressure chamber and nozzles, and the ink composition is retained at the step portion to accumulate into an ink film, and landing deviation of the ink and clogging easily occur during continuous printing. However, according to the ink jet recording method of the application example described above, since it is possible to reduce the accumulation of an ink film at the step portion even with an ink jet head having such a structure, it is possible to provide an ink jet recording method excellent in ink ejection stability.

Application Example 15

According to still another aspect of the invention, there is provided an ink jet recording apparatus including an ink jet head, in which the ink jet recording apparatus performs the ink jet recording method according to any one of Application Examples 7 to 14.

According to the application example described above, it is possible to provide an ink jet recording apparatus capable of performing ink jet recording with secured printing quality during fine line printing by performing recording using the ink jet recording method of the application example described above.

Application Example 16

In the application example described above, a mechanism for discharging ink from an ink jet head which is not a pressure generating unit for recording by ejecting an ink composition provided in an ink jet head may be further provided, in which it is possible to perform control in which the ink jet recording method is performed for one hour or longer without performing cleaning performed using the mechanism.

According to the application example described above, since recording is performed by the ink jet recording method described above, it is possible to realize ink jet recording excellent in ejection stability for one hour or longer without performing a cleaning in particular.

BRIEF DESCRIPTION OF THE DRAWINGS

The invention will be described with reference to the accompanying drawings, wherein like numbers reference like elements.

DESCRIPTION OF EXEMPLARY EMBODIMENTS

A description will be given below of preferable embodiments of the invention. The embodiments described below explain one example of the invention. In addition, the invention is not limited to the following embodiments, but also includes various modified examples implemented within a scope not changing the gist of the invention.

One aspect of the aqueous ink jet ink composition according to the present embodiment includes a pigment dispersion formed of a surface-treated pigment having a phosphorus-containing group on a surface thereof; and a resin dispersion, in which the ink composition has a conductivity of 2600 µs/cm or less. In addition, the ink jet recording method according to the present embodiment includes an ink attaching step of ejecting the aqueous ink jet ink composition according to the present embodiment from the ink jet head and attaching the aqueous ink jet ink composition to a recording medium.

Below, regarding the aqueous ink jet ink composition and the ink jet recording method according to the present embodiment, a description will be given of an ink jet recording apparatus which performs recording using this recording method, an aqueous ink jet ink composition (also referred to below as "ink"), each configuration of a reaction liquid and a recording medium, and an ink jet recording method, in this order.

1. Configurations 1.1. Ink Jet Recording Apparatus

A description will be given of an example of an ink jet recording apparatus in which the ink jet recording method according to the present embodiment is carried out with reference to the drawings. Here, the ink jet recording apparatus which is able to be used in the ink jet recording method according to the present embodiment is not limited to the following aspect.

Figure 1:
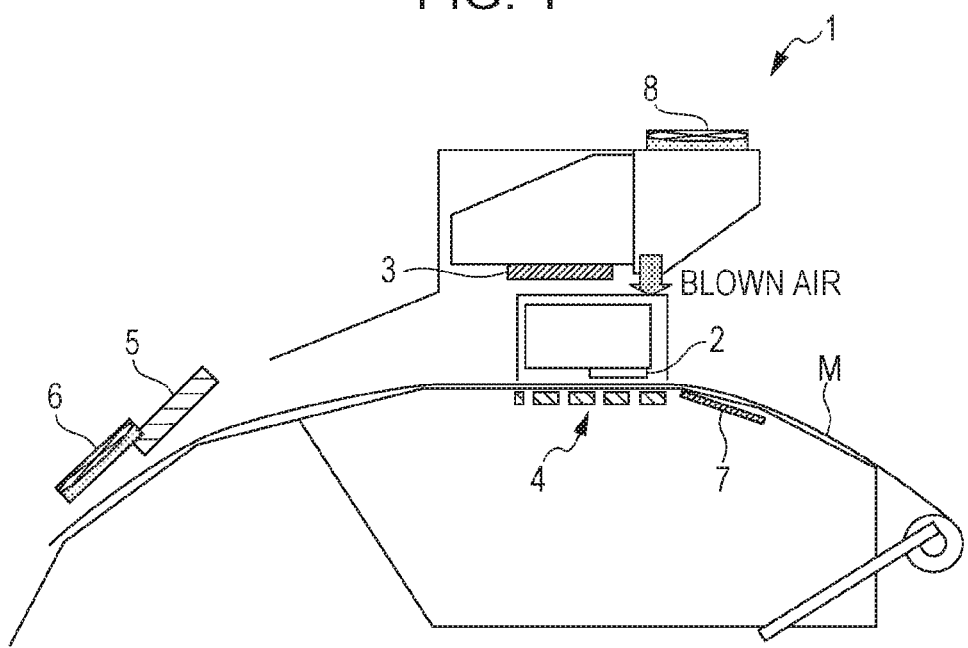
FIG. 1 is a schematic cross-sectional view schematically showing an ink jet recording apparatus.

FIG. 1 is a schematic cross-sectional view schematically showing the ink jet recording apparatus 1. As shown in FIG. 1, the ink jet recording apparatus 1 is provided with an ink jet head 2, an IR heater 3, a platen heater 4, a curing heater 5, a cooling fan 6, a preheater 7, and a ventilation fan 8. The ink jet recording apparatus 1 is provided with a control unit (not shown), and the entire operation of the ink jet recording apparatus 1 is controlled by the control unit.

Figure 2:
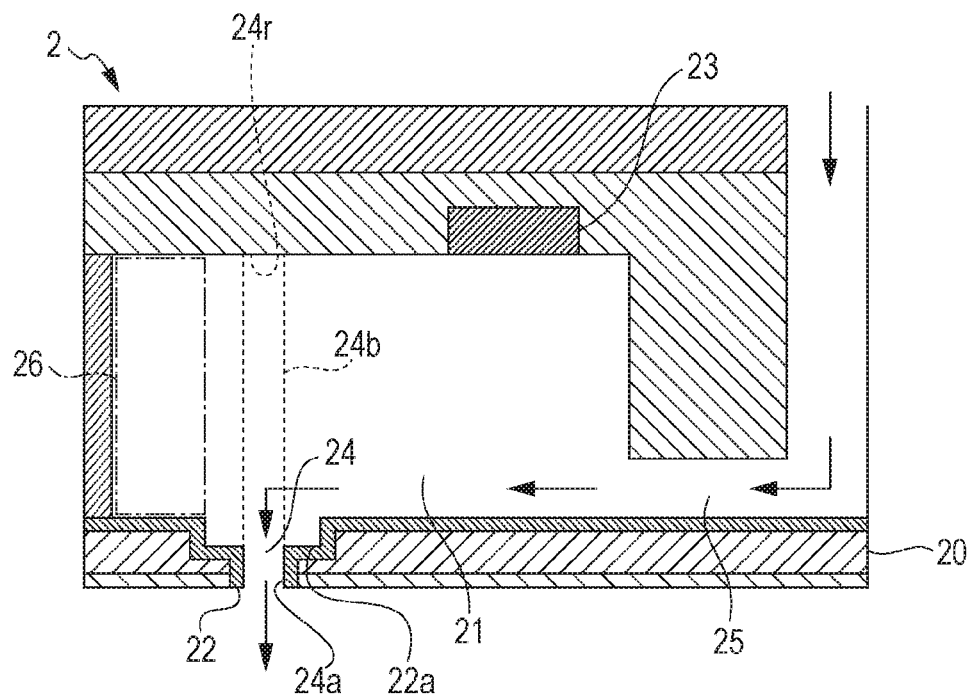
FIG. 2 is a schematic cross-sectional view schematically showing a structure of an ink jet head shown in FIG. 1.

The ink jet head 2 is a unit for ejecting and attaching the ink composition to the recording medium M, for example, it is possible to use the type shown in FIG. 2.

The ink jet head 2 is provided with a nozzle 22 which ejects the ink composition. Examples of a method of ejecting ink from a nozzle include a method (electrostatic suction method) in which a strong electric field is applied between a nozzle and an accelerating electrode placed in front of the nozzle, droplet-shaped ink is continuously ejected from the nozzle, and ink droplets are ejected corresponding to a record information signal while flying between deflection electrodes; a method in which pressure is applied to the ink by a small pump and the nozzle is mechanically vibrated by a crystal oscillator or the like to forcibly eject ink droplets; a method (piezo method) in which pressure is applied to ink by a piezoelectric element at the same time as a recording information signal and the ink droplets are ejected and recorded; a method (thermal jet method) in which ink is heated and foamed by a microelectrode according to a recording information signal and ink droplets are ejected and recorded, and the like.

As the ink jet head 2, it is possible to use any of a serial type ink jet head and a line type ink jet head.

Here, the ink jet recording apparatus provided with a serial type ink jet head performs an ink attaching step in which scanning (passes) is performed a plurality of times for attaching the ink to the recording medium M by ejecting the ink from the ink jet head 2 while the ink jet head 2 changes the position relative to the recording medium M.

Specific examples of serial type ink jet heads include examples in which an ink jet head is mounted on a carriage which moves in the width direction of the recording medium (direction intersecting the transport direction of the recording medium), and the ink jet head moves in accordance with the movement of the carriage to eject droplets on the recording medium. A serial printer, which is a serial type ink jet recording apparatus, performs a main scanning (passes) in which a head ejects ink while moving in a main scanning direction which intersects with a sub scanning direction of a recording medium, and recording is normally performed with two or more passes (multiple passes).

On the other hand, an ink jet recording apparatus provided with a line type ink jet head performs recording by performing scanning (passes) for ejecting ink one time. Specific examples of line type ink jet heads include an ink jet head which is formed wider than the width of the recording medium and ejects droplets onto the recording medium without the head moving.

In the present embodiment, an ink jet recording apparatus provided with a serial type ink jet head is used as the ink jet recording apparatus 1, and an ink jet head using a piezo method as a method of ejecting ink from a nozzle is used.

FIG. 2 is a schematic cross-sectional view schematically showing the structure of the ink jet head 2. In FIG. 2, the arrows indicate the movement direction of the ink. The ink jet head 2 is provided with a pressure chamber 21 and a piezoelectric element 23 which applies pressure to the pressure chamber 21 to eject the ink composition from the nozzle 22, and, in the pressure chamber 21, the piezoelectric element 23 is arranged at a position other than a position 24r opposing an outflow port 24 communicating with the nozzle 22. In a case where the piezoelectric element 23 is provided directly above the nozzle 22, the extrusion force of ink from the piezoelectric element 23 is also transmitted directly to the ink film attached to the nozzle wall surface 24a, thus, attachment of the ink film is easily eliminated; however, in a case where the piezoelectric element 23 is not provided directly above the nozzle 22, it is difficult to eliminate the attachment of the ink film, thus the ink jet recording method according to the present embodiment is particularly useful.

Here, the position 24r opposed to the outflow port 24 communicating with the nozzle 22 in the pressure chamber 21 means directly above the nozzle 22, and, in a case where it is assumed that a line (indicated by a broken line in FIG. 2) is extended from the wall 24a of the outflow port 24 toward the upper part of the diagram, means the region surrounded by an extension line 24b and an extension line 24b in FIG. 2. For example, for the ink jet head 2 of FIG. 2, the area of the outflow port 24 in the direction orthogonal to the direction in which the ink is ejected is a portion which is the same as the nozzle 22, not a portion widened further in. Accordingly, the piezoelectric element 23 being arranged at a position other than the position 24r means that at least a part of the piezoelectric element 23 is not positioned at least in a part of this region (position 24r). As another example of the ink jet head in which the piezoelectric element 23 is not provided directly above the nozzle 22, there is an ink jet head provided with a piezoelectric element on a wall at either the front side or the back side of the pressure chamber 21 in FIG. 2.

The pressure chamber 21 has a retention portion 26 which retains ink in a direction extended in the ink moving direction in which the supply port 25 through which the ink is supplied to the pressure chamber 21 and the outflow port 24 of the pressure chamber 21 are connected. This retention portion 26 is a portion formed in a step of mass-producing the ink jet head 2 and it is difficult to mass-produce an ink jet head provided with the pressure chamber 21 without the retention portion 26. In this retention portion 26, the ink composition builds up easily, and ink dried matter (resin deposited matter) easily accumulates. Then, when bubbles gather and a space is formed, the ink dried matter is attached to the wall surface. On the other hand, according to the ink jet recording method using the aqueous ink jet ink composition according to the present embodiment described below, even in the ink jet head 2 having such a structure, it is possible to reduce the accumulation of the ink dried matter in the retention portion 26 and an ink jet recording method excellent in ink ejection stability is obtained.

In addition, the ink jet head 2 may have a flow path through which ink passes from the pressure chamber 21 to the nozzle 22, that is, a step portion 22a downstream of the pressure chamber 21. This step portion 22a may be formed in the process of manufacturing the ink jet head. For example, the step portion 22a is a portion formed when forming the nozzle 22 by etching the silicon layer (nozzle plate 20) and it is difficult to form the nozzle plate 20 in which the step portion 22a is eliminated by etching the silicon layer. It is sufficient as long as the step portion 22a is present between the outflow port 24 of the pressure chamber 21 and the nozzle 22, and is not limited to being formed in the nozzle plate 20. Bubbles may be attached and remain on the step portion 22a during the initial filling of the ink or cleaning, the bubbles float from the step portion 22a during recording and gather above the pressure chamber 21, a gas-liquid interface is generated here, the ink is dried, and ink dried matter (resin deposited matter) is produced. On the other hand, according to the ink jet recording method of the present embodiment, even when the step portion 22a is present, it is possible to reduce the accumulation of the ink dried matter at the step portion 22a and to provide an ink jet recording method with excellent ink ejection stability.

In the present embodiment, the pressure chambers 21 of the ink jet head 2 and a plurality of ejection driving portions (not shown) and nozzles 22 provided for each of the pressure chambers 21 may be provided independently from each other in one head. Here, it is possible to form the ejection driving portion using an electromechanical conversion element such as a piezoelectric element 23 which changes the volume of the pressure chamber 21 by mechanical deformation, an electrothermal conversion element which generates bubbles in the ink by emitting heat and ejects the ink, or the like.

Returning to FIG. 1, the ink jet recording apparatus 1 is provided with an IR heater 3 and a platen heater 4 for heating the recording medium M at the time of ejecting the ink composition from the ink jet head 2. In the present embodiment, in the ink attaching step described below, when heating the recording medium M, it is sufficient to use at least one of the IR heater 3 and the platen heater 4.

Using the IR heater 3 makes it possible to heat the recording medium M from the ink jet head 2 side. Due to this, although the ink jet head 2 is also easily heated at the same time, it is possible to raise the temperature without being influenced by the thickness of the recording medium M, as compared with a case where the recording medium M is heated from the rear side, such as with the platen heater 4. In addition, when the platen heater 4 is used when heating the recording medium M, it is possible to heat the recording medium M from the side opposite to the ink jet head 2 side. Due to this, it is relatively difficult for the ink jet head 2 to be heated. However, the surface temperature of the recording medium M due to the IR heater 3 and the platen heater 4 is preferably 30° C. or higher and 55° C. or lower. Due to this, the radiation heat received from the IR heater 3 and the platen heater 4 is reduced or eliminated, thus, it is possible to suppress the drying and composition variation of the ink composition in the ink jet head 2, and the resin is prevented from being deposited on the inner wall of the ink jet head 2.

The curing heater 5 is for drying and solidifying the ink composition recorded on the recording medium M. The curing heater 5 heating the recording medium M on which the image is recorded evaporates moisture or the like included in the ink composition more quickly to form the ink film using the fine resin particles included in the ink composition. In this manner, the ink film firmly fixes (adheres) to the recording medium M, and it is possible to obtain a high-quality image excellent in abrasion resistance in a short time. The drying temperature by the curing heater 5 is preferably 40° C. or higher and 120° C. or lower, more preferably 60° C. or higher and 100° C. or lower, and even more preferably 80° C. or higher and 90° C. or lower.

The ink jet recording apparatus 1 may have a cooling fan 6. After drying the ink composition recorded on the recording medium M, the ink composition on the recording medium M is cooled by the cooling fan 6, so as to be able to form the ink film on the recording medium M with high adhesion.

In addition, the ink jet recording apparatus 1 may be provided with the preheater 7 which heats (preheats) the recording medium M in advance before the ink composition is ejected onto the recording medium M. Furthermore, the recording apparatus 1 may be provided with a ventilation fan such that the ink composition attached to the recording medium M is more efficiently dried.

1.2. Aqueous Ink Jet Ink Composition

Next, a description will be given of the aqueous ink jet ink composition according to the present embodiment. The aqueous ink jet ink composition according to the present embodiment contains a pigment dispersion formed of a surface-treated pigment having a phosphorus-containing group on a surface thereof, and a resin dispersion, in which the ink composition has a conductivity of 2600 µs/cm or less. A detailed description will be given below of components included and able to be included in the aqueous ink jet ink composition in the present embodiment.

In the invention, the "aqueous" ink jet ink composition is a composition in which water is the main solvent and an organic solvent is not used as a main solvent. The content of the organic solvent in the composition is preferably 30% by mass or less, with respect to 100% by mass of the composition, more preferably 25% by mass or less, and particularly preferably 20% by mass or less. The content of water in the ink composition (100% by mass) is preferably 50% by mass or more, more preferably 60% by mass or more, and particularly preferably 70% by mass or more.

1.2.1. Pigment Dispersion

In the present embodiment, the aqueous ink jet ink composition includes a pigment dispersion formed of a surface-treated pigment having a phosphorus-containing group on the surface thereof.

In the present embodiment, the pigment to be subjected to the surface treatment so as to have the phosphorus-containing group on the surface thereof is not particularly limited, but examples thereof include inorganic pigments and organic pigments. As the inorganic pigment, in addition to titanium oxide and iron oxide, it is possible to use carbon black produced by a known method such as a contact method, a furnace method, a thermal method, or the like. On the other hand, as the organic pigment, it is possible to use azo pigments (including azo lake, insoluble azo pigments, condensed azo pigments, chelate azo pigments, and the like), polycyclic pigments (for example, phthalocyanine pigments, perylene pigments, perinone pigments, anthraquinone pigments, quinophthalone pigments, and the like), nitro pigments, nitroso pigments, aniline black, and the like.

Among specific examples of the pigment usable in the present embodiment, carbon black is an example of a black pigment, and the carbon black is not particularly limited, and examples thereof include furnace black, lamp black, acetylene black, channel black, or the like (C.I. Pigment Black 7), and examples of commercial products include No. 2300, 900, MCF 88, No. 20B, No. 33, No. 40, No. 45, No. 52, MA 7, MA 8, MA 77, MA 100, No. 2200B, and the like (the above are all trade names manufactured by Mitsubishi Chemical Corporation), Color black FW 1, FW 2, FW 2 V, FW 18, FW 200, S 150, S 160, S 170, PRETEX 35, U, V, 140 U, special black 6, 5, 4A, 4, 250, and the like (the above are all trade names manufactured by Evonik Japan), Conductex SC, Raven 1255, 5750, 5250, 5000, 3500, 1255, 700, and the like (the above are all trade names manufactured by Columbia Carbon), and Regal 400R, 330R, 660R, Mogul L, Monarch 700, 800, 880, 900, 1000, 1100, 1300, 1400, Elf Tech 12, and the like (the above are all trade names manufactured by Cabot Japan KK).

The white pigment is not particularly limited, but examples thereof include white inorganic pigments of C.I. Pigment White 6, 18, 21, titanium oxide, zinc oxide, zinc sulfide, antimony oxide, magnesium oxide, and zirconium oxide. In addition to the white inorganic pigment, it is also possible to use white organic pigments such as white hollow resin particles and polymer particles.

The pigment used for the yellow ink is not particularly limited, but examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment used for the magenta ink is not particularly limited, but examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245 or C.I. Pigment Violet 19, 23, 32, 33, 36, 38, 43, and 50.

The pigment used for the cyan ink is not particularly limited, but examples thereof include C.I. Pigment Blue 1, 2, 3, 15, 15: 1, 15: 2, 15: 3, 15: 34, 15: 4, 16, 18, 22, 25, 60, 65, 66; C.I. Vat Blue 4, and 60.

In addition, pigments used for color inks other than magenta, cyan, and yellow are not particularly limited, and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, and 63.

The pearl pigment is not particularly limited, but examples thereof include pigments having pearly luster and interference gloss such as titanium dioxide-coated mica, fish scale foil, and bismuth oxychloride.

Examples of metallic pigments are not particularly limited, but examples thereof include particles formed of a single substance such as aluminum, silver, gold, platinum, nickel, chromium, tin, zinc, indium, titanium, and copper, or an alloy.

The content of the surface-treated pigment included in the ink composition is preferably 0.5% by mass or more and 10% by mass or less with respect to the total mass (100% by mass) of the aqueous ink jet ink composition, more preferably 1% by mass or more and 7.0% by mass or less, even more preferably 1% by mass or more and 6.5% by mass or less, and yet more preferably 2% by mass or more and 6% by mass or less. Setting the content of the surface-treated pigment in the range described above makes it possible to secure ejection reliability at the time of recording and to form an image excellent in color development and abrasion resistance.

In order to apply the pigment described above to the aqueous ink jet ink composition, it is necessary to stably disperse and hold the pigment in water. Examples of the method include a method of dispersing with a resin dispersant such as a water-soluble resin and/or a water-dispersible resin (the pigment dispersed by this method is referred to below as a "resin-dispersed pigment"), a method of dispersing with a surfactant of a water-soluble surfactant and/or a water-dispersible surfactant (a pigment dispersed by this method is referred to below as a "surfactant-dispersed pigment"), a method in which a hydrophilic functional group is chemically and physically introduced to the surface of the pigment particle so as to be able to be dispersed and/or dissolved in water without a dispersant such as the resin or the surfactant (a pigment dispersed by this method is referred to below as a "surface-treated pigment"), and the like.

In the present embodiment, in the aqueous ink jet ink composition, the pigment is stably dispersed and held in water by using a surface-treated pigment subjected to a surface treatment having a phosphorus-containing group on the surface thereof, but, as necessary, a surface-treated pigment having another hydrophilic functional group, resin dispersant, or surfactant may be used in combination therewith.

The phosphorus-containing group which is a hydrophilic functional group preferably has either a P—O group or a P=O group. Examples of phosphorus-containing groups include a phosphonic group, a phosphinic group, a phosphinous group, a phosphite group, a phosphate group, a diphosphate group, a triphosphate group, and a pyrophosphate group. By using a surface-treated pigment having a phosphorus-containing group on surface thereof as a surface-treated pigment, the permeability of the ink to the recording medium and the affinity with the recording medium are improved, unintentional bleeding or spreading of the ink on the recording medium is suppressed, and it is possible to obtain an aqueous ink jet ink composition excellent in storage stability while securing printing quality during fine line printing.

Examples of hydrophilic functional groups other than the phosphorus-containing group include —OM, —COOM, —CO—, —SO$_3$M, —SO$_2$NH$_3$, —RSO$_3$M, —SO$_3$NHCOR, —NH$_3$, —NR$_3$ (here, in the formula, M represents a hydrogen atom, an alkali metal, and ammonium or organic ammonium, R represents an alkyl group having 1 to 12 carbon atoms, a phenyl group which may have a substituent, or a naphthyl group which may have a substituent), and the like.

The functional groups described above are physically and/or chemically introduced by grafting directly and/or via other groups on the pigment particle surface. Examples of polyvalent groups include an alkylene group having 1 to 12 carbon atoms, a phenylene group which may have a substituent, a naphthylene group which may have a substituent, and the like.

In addition, as the surface-treated pigment, a pigment is preferable which is surface treated such that —SO$_3$M and/or —RSO$_3$M (M is a counter ion and is a hydrogen ion, alkali metal ion, ammonium ion, or organic ammonium ion) is chemically bonded to the pigment particle surface using a treating agent including sulfur, that is, a pigment is preferable which is dispersed in a solvent which does not have active protons, which has no reactivity with sulfonic acid, and in which the pigment is insoluble or poorly soluble, and which is then subjected to a surface treatment such that —SO$_3$M and/or —RSO$_3$M is chemically bonded to the particle surface with amidosulfuric acid or a complex of sulfur trioxide and a tertiary amine such that the pigment is dispersed and/or dissolvable in water.

As the surface treatment unit for grafting the functional group or a salt thereof onto the surface of the pigment particle directly or via a polyvalent group, it is possible to apply various known surface treatment units. Examples of the units include a unit for applying ozone or a sodium hypochlorite solution to commercially available oxidized carbon black and subjecting the carbon black to a further oxidization treatment to further hydrophilize the surface thereof (for example, JP-A-7-258578, JP-A-8-3498, JP-A-10-120958, JP-A-10-195331, and JP-A-10-237349), a unit for treating carbon black with 3-amino-N-alkyl substituted pyridium bromide (for example, JP-A-10-195360 and JP-A-10-330665), a unit for dispersing an organic pigment in a solvent in which the organic pigment is insoluble or hardly soluble, and introducing a sulfone group onto the surface of the pigment particle using a sulfonating agent (for example, JP-A-8-283596, JP-A-10-110110, and JP-A-10-110111), a unit for dispersing an organic pigment in a basic solvent which forms a complex with sulfur trioxide, treating the surface of an organic pigment by adding sulfur trioxide, and introducing a sulfone group or a sulfonamino group (for example, JP-A-10-110114), and the like; however, the unit for preparing the surface-treated pigment used in the invention is not limited to these units.

The number of functional groups grafted to one pigment particle may be one or a plurality. The kind and degree of the functional group to be grafted may be appropriately determined in consideration of the dispersion stability in the ink, the color density, the drying property on the front face of the ink jet head, and the like.

Examples of resin dispersants include polyvinyl alcohols, polyvinyl pyrrolidones, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymer, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acryl acid copolymers and the like and salts thereof. Among these, in particular, a copolymer of a monomer having a hydrophobic functional group and a monomer having a hydrophilic functional group, and a polymer formed of a monomer having both a hydrophobic functional group and a hydrophilic functional group are preferable. As the form of the copolymer, it is possible to use any of a random copolymer, a block copolymer, an alternating copolymer, and a graft copolymer.

Examples of salts include basic compounds and salts thereof such as ammonia, ethylamine, diethylamine, triethylamine, propylamine, isopropylamine, dipropylamine, butylamine, isobutylamine, diethanolamine, triethanolamine, tri-iso-propanolamine, aminomethylpropanol, and morpholine. The addition amount of these basic compounds is not particularly limited as long as the addition amount is the neutralization equivalent or more of the resin dispersant.

The molecular weight of the resin dispersant is preferably in the range of 1,000 to 100,000 as the weight average molecular weight, and more preferably in the range of 3,000 to 10,000. By the molecular weight being within the above range, a stable dispersion of the coloring material in water is obtained, and viscosity control and the like at the time of application to the ink composition are easy.

It is also possible to use commercial products as the resin dispersant described above. Specific examples thereof include Joncryl 67 (weight average molecular weight: 12,500, acid value: 213), Joncryl 678 (weight average molecular weight: 8,500, acid value: 215), Joncryl 586 (weight average molecular weight: 4,600, acid value: 108), Joncryl 611 (weight average molecular weight: 8,100, acid value: 53), Joncryl 680 (weight average molecular weight: 4,900, acid value: 215), Joncryl 682 (weight average molecular weight: 1,700, acid value: 238), Joncryl 683 (weight average molecular weight: 8,000, acid value: 160), Joncryl 690 (weight average molecular weight: 16,500, acid value: 240), (the above are all trade names, manufactured by BASF Japan Ltd.), and the like.

In addition, examples of surfactants include anionic surfactants such as alkane sulfonate, α-olefin sulfonate, alkylbenzene sulfonate, alkyl naphthalene sulfonate, acyl methyl taurate, dialkyl sulfosuccinate, alkyl sulfate ester salt, sulfate olefins, polyoxyethylene alkyl ether sulfuric acid ester salts, alkyl phosphoric acid ester salts, polyoxyethylene alkyl ether phosphoric acid ester salts, and monoglyceride phosphoric acid ester salts, amphoteric surfactants such as alkylpyridium salts, alkyl amino acid salts, and alkyl dimethyl betaine, and nonionic surfactants such as polyoxyethylene alkyl ether, polyoxyethylene alkyl phenyl ether, polyoxyethylene alkyl ester, polyoxyethylene alkyl amide, glycerin alkyl ester, and sorbitan alkyl esters.

The addition amount of the resin dispersant or the surfactant to the pigment is preferably 1 part by mass or more and 100 parts by mass or less with respect to 100 parts by mass of the pigment, and more preferably 5 parts by mass or more and 50 parts by mass or more. Within this range, it is possible to secure the dispersion stability of the pigment in water.

The surface-treated pigment described above is used as a pigment dispersion by being dispersed in water. It is possible to perform a method of dispersing the surface-treated pigment in water in a dispersing machine used in the related art such as a ball mill, a sand mill, an attritor, a roll mill, an agitator mill, a Henschel mixer, a colloid mill, an ultrasonic homogenizer, a jet mill, an Ong mill, or the like by adding a surface-treated pigment and water as well as a water-soluble organic solvent, a neutralizing agent, or the like to each as necessary. In such a case, regarding the particle size of the pigment, the dispersion is performed with an average particle size of 20 nm or more and 500 nm or less and more preferably 50 nm or more and 200 nm or less, which is preferable from the viewpoint of securing the dispersion stability of the pigment in water. The same applies in a case where a resin dispersant or a surfactant is used.

1.2.2. Resin Dispersion

In the present embodiment, the aqueous ink jet ink composition includes a resin dispersion in which the resin is dispersed in water (that is, in an emulsion state or a suspension state). The resin component of the resin dispersion has an effect of solidifying the ink and firmly fixing the ink solid matter on the recording medium, and it is possible to improve the abrasion resistance of the image.

The resin of the resin dispersion is not particularly limited, and examples thereof include homopolymers or copolymers of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride, fluororesins, and natural resins. Among these, the resin is preferably a (meth)acrylic resin which is a homopolymer or copolymer of at least one of (meth)acrylic monomers such as (meth)acrylic acid, (meth)acrylic acid ester, acrylonitrile, and cyanoacrylate. Among (meth)acrylic resins, copolymers of (meth)acrylic monomers and vinyl monomers are preferable. The vinyl monomer is not limited, but examples thereof include styrene and the like. A styrene-acrylic copolymer type resin which is a copolymer of a (meth)acrylic monomer and styrene is particularly preferable. The copolymer described above may be in any form of a random copolymer, a block copolymer, an alternating copolymer, and a graft copolymer. In addition, polyurethane-based resins, polyester-based resins, and polyether-based resins are also preferable as the resin.

The resin described above is not particularly limited, but is able to be obtained by, for example, the following preparation methods, and a plurality of methods may be combined as necessary. Examples of preparation methods include a method in which a polymerization catalyst (polymerization initiator) are mixed in a monomer which is a component forming a desired resin and a dispersant and polymerized (emulsion polymerization), a method in which a solution obtained by dissolving a resin having a hydrophilic part in a water-soluble organic solvent is mixed in water and then the water-soluble organic solvent is removed by distillation or the like, and a method in which a solution obtained by dissolving a resin in a water-insoluble organic solvent and a dispersant are mixed in an aqueous solution.

The average particle size of the resin described above is preferably 10 nm to 500 nm, more preferably 20 nm to 400 nm, and particularly preferably 30 nm to 300 nm. The average particle size of the resin being within the above range makes it possible to reduce clogging of the nozzle since the film forming property is excellent and the resin does not easily form large lumps even when aggregated. The average particle size in the present specification is on a volume basis unless otherwise specified. As a measuring method, for example, it is possible to carry out the measurement using a particle size distribution measuring apparatus using dynamic light scattering theory as a measurement principle. An example of such a particle size distribution measuring apparatus is "Microtrac UPA" manufactured by Nikkiso Co., Ltd.

The content of the resin dispersion is preferably 1% by mass or more and 15% by mass or less with respect to the total mass (100% by mass) of the ink composition in terms of solid content, more preferably 2% by mass or more and 12% by mass or less, and more preferably 3% by mass or more and 10% by mass or less. The solid content of the resin dispersion being within the above range makes it possible to secure ejection reliability at the time of recording and to form an image excellent in abrasion resistance.

1.2.3. Water

In the present embodiment, the aqueous ink jet ink composition contains water. Water is the main medium of the aqueous ink jet ink composition, and is a component that evaporates and scatters by heating. It is preferable that the water be obtained by removing ionic impurities or the like as much as possible like pure water or ultrapure water such as ion-exchanged water, ultra-filtered water, reverse osmosis water, and distilled water. In addition, the use of water sterilized by ultraviolet ray irradiation or addition of hydrogen peroxide or the like is suitable since it is possible to suppress the generation of fungi and bacteria when the pigment dispersion liquid and the ink composition using the same are stored for a long time.

The content of water is preferably 50% by mass or more with respect to the total mass (100% by mass) of the aqueous ink jet ink composition, more preferably 55% by mass or more, and particularly preferably 60% by mass or more.

1.2.4. Organic Solvent

In the present embodiment, the aqueous ink jet ink composition may contain an organic solvent. The ink composition containing an organic solvent gives the aqueous ink jet ink composition ejected onto the recording medium a good drying property and makes it possible to obtain an image excellent in abrasion resistance.

The organic solvent used for the ink composition is preferably a water-soluble organic solvent. Using the water-soluble organic solvent improves the drying property of the ink composition and makes it possible to obtain an image excellent in abrasion resistance.

Examples of water-soluble organic solvents are not particularly limited, but examples thereof include alcohols such as methanol, ethanol, and isopropyl alcohol; ketones or ketoalcohols such as acetone and diacetone alcohol; ethers such as tetrahydrofuran and dioxane; glycols such as hexanediol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols such as ethylene glycol monomethyl ether, diethylene glycol monomethyl ether, diethylene glycol monoethyl ether, and diethylene glycol monobutyl ether; amines having a hydroxyl group such as diethanolamine and triethanolamine; and glycerin. Among these, propylene glycol, 1,2-hexanediol, 1,3-butanediol, and the like are preferably used from the viewpoint of improving the drying property of the aqueous ink jet ink composition.

The content of the organic solvent is preferably 2.0% by mass or more and 45% by mass or less with respect to the total mass (100% by mass) of the aqueous ink jet ink composition, more preferably 4.0% by mass or more and 40% by mass or less, and particularly preferably 6.0% by mass or more and 35% by mass or less. The standard boiling point of the organic solvent is preferably 180° C. or higher, more preferably 180° C. or higher and 300° C. or lower, even more preferably 200° C. or higher and 270° C. or lower, and particularly preferably 210° C. or higher and 250° C. or lower. In a case where the standard boiling point of the organic solvent is within the above range, the ejection reliability and abrasion resistance of the ink composition are superior, which is preferable.

In addition, in the present embodiment, the organic solvent used in the aqueous ink jet ink composition preferably includes a nitrogen-containing solvent. Examples of nitrogen-containing solvents include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like.

The content of the nitrogen-containing solvent is preferably from 1.0% by mass or more and 25% by mass or less with respect to the total mass (100% by mass) of the aqueous ink jet ink composition, more preferably from 2.0% by mass or more and 20% by mass or less, and even more preferably 3.0% by mass or more and 17% by mass or less. The content of the nitrogen-containing solvent being within the above range makes it possible to easily obtain recorded matter excellent in abrasion resistance. In addition, since the resin described above is easily dissolved in the ink composition, nozzle clogging may occur.

Here, an organic solvent having a boiling point of 280° C. or higher may absorb moisture of the ink to increase the viscosity of the ink near the ink jet head, which may lower the ejection stability of the ink jet head. In addition, the drying property of the ink is greatly reduced. For this reason, in the aqueous ink jet ink composition in the present embodiment, the content of the organic solvent having a standard boiling point of 280° C. or higher is preferably 5% by mass or less, more preferably 3% by mass or less, even more preferably 2% by mass or less, still more preferably 1% by mass or less, and yet more preferably 0.5% by mass or less. In such a case, in various recording media, particularly in recording media with an ink non-absorbing property or with a low ink absorbing property, since the drying property of the ink composition on the recording medium becomes high, the occurrence of bleeding is suppressed and the shading unevenness of the image is suppressed so as to be able to form an image excellent in image quality.

Examples of an organic solvent having a boiling point of 280° C. or higher include glycerin. Glycerin has high hygroscopicity and a high boiling point, which may cause clogging and malfunctioning of the ink jet head. In addition, glycerin is poor in antiseptic properties and allows fungi and fungi to easily propagate, thus, it is preferable that glycerin not be contained in the ink composition.

1.2.5. Surfactant

In the present embodiment, it is preferable that the aqueous ink jet ink composition contain a surfactant. The surfactant is not particularly limited, and examples thereof include an acetylene glycol-based surfactant, a fluorine-based surfactant, and a silicone-based surfactant, and it is preferable that at least one kind thereof be contained.

The acetylene glycol-based surfactant is not particularly limited, but preferable examples thereof include one kind or more selected from 2,4,7,9-tetramethyl-5-decyne-4,7-diol and alkylene oxide adducts of 2,4,7,9-tetramethyl-5-decyne-4,7-diol, and 2,4-dimethyl-5-decyn-4-ol and alkylene oxide adducts of 2,4-dimethyl-5-decyn-4-ol. Commercial products of acetylene glycol-based surfactants are not particularly limited, but examples thereof include E series (trade names, manufactured by Air Products) such as Olfine 104 series and Olfine E 1010; Surfynol 465, Surfynol 61, and Surfynol DF 110D (trade name, manufactured by Nisshin Chemical Industry Co., Ltd.), and the like. The acetylene glycol-based surfactant may be used alone or in a combination of two or more kinds.

The fluorine-based surfactant is not particularly limited, but examples thereof include perfluoroalkyl sulfonate, perfluoroalkyl carboxylate, perfluoroalkyl phosphate ester, perfluoroalkyl ethylene oxide adduct, perfluoroalkyl betaine, and perfluoroalkyl amine oxide compounds. Commercial products of fluorine-based surfactants are not particularly limited and examples thereof include Surflon S144, S145 (the above are trade names, manufactured by AGC Seimi Chemical Co., Ltd.); FC-170C, FC-430, Fluorad-FC 4430 (the above are trade names, manufactured by Sumitomo 3M Ltd.); FSO, FSO-100, FSN, FSN-100, FS-300 (the above are trade names, manufactured by Dupont); FT-250, 251 (the above are trade names, manufactured by Neos Co., Ltd.). The fluorine-based surfactant may be used alone or in a combination of two or more kinds thereof.

The silicone-based surfactant is not particularly limited, and examples thereof include a polysiloxane-based compound, a polyether-modified organosiloxane, and the like. Commercial products of silicone-based surfactants are not particularly limited, but specific examples thereof include BYK-306, BYK-307, BYK-333, BYK-341, BYK-345, BYK-346, BYK-347, BYK-348, and BYK-349 (the above are trade names, manufactured by BYK Additives & Instruments), KF-351 A, KF-352 A, KF-353, KF-354 L, KF-355 A, KF-615 A, KF-945, KF-640, KF-642, KF-643, KF-6020, X-22-4515, KF-6011, KF-6012, KF-6015, and KF-6017 (the above are trade names, manufactured by Shin-Etsu Chemical Co., Ltd.).

Among these, it is possible for the acetylene glycol-based surfactant to further improve nozzle clogging recoverability. On the other hand, the fluorine-based surfactant and the silicone-based surfactant are preferable in the point of having a function of spreading uniformly so as not to cause density unevenness or bleeding of the ink on the recording medium. Accordingly, in the present embodiment, it is more preferable that the aqueous ink jet ink composition contain at least one of a silicone-based surfactant and a fluorine-based surfactant, and an acetylene glycol-based surfactant.

The lower limit of the content of the acetylene glycol-based surfactant is preferably 0.1% by mass or more based on the total mass (100% by mass) of the aqueous ink jet ink composition, more preferably 0.3% by mass or more, and particularly preferably 0.5% by mass or more. On the other hand, the upper limit of the content is preferably 5% by mass or less, more preferably 3% by mass or less, and particularly preferably 2% by mass or less. When the content of the acetylene glycol-based surfactant is in the above range, it is possible to easily obtain the effect of improving the nozzle clogging recoverability.

The lower limit of the content of the fluorine-based surfactant and the silicone-based surfactant is preferably 0.5% by mass or more, and more preferably 0.8% by mass or more. On the other hand, the upper limit of the content is preferably 5% by mass or less, and more preferably 3% by mass or less. When the contents of the fluorine-based surfactant and the silicone-based surfactant are in the above ranges, it is preferable in the point of having a function of spreading uniformly so as not to cause density unevenness or bleeding of the ink on the recording medium.

1.2.6. Other Components

In the present embodiment, in order to maintain good storage stability and ejection stability from the head, to improve clogging, or to prevent deterioration of the ink, it is also possible to appropriately add various additives to the aqueous ink jet ink composition such as a foaming agent, a dissolution aid, a viscosity adjusting agent, a pH adjusting agent, an antioxidant, a preservative, a mildewproofing agent, a corrosion inhibitor, a moisturizing agent which is not an organic solvent, and a chelating agent for capturing metal ions which influence the dispersion.

Examples of pH adjusting agents include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium bicarbonate, and the like.

Examples of preservatives/fungicides include sodium benzoate, sodium pentachlorophenol, sodium 2-pyridinethiol-1-oxide, sodium sorbate, sodium dehydroacetate, 1,2-dibenzisothiazolin-3-one, and the like. Examples of commercial products include Proxel XL 2, Proxel GXL (the above are trade names, manufactured by Avecia Ltd.), Denicide CSA, NS-500 W (the above are trade names, manufactured by Nagase ChemteX Corporation), and the like.

Examples of rust inhibitors include benzotriazole and the like.

Examples of chelating agents include ethylenediaminetetraacetic acid and salts thereof (disodium ethylenediaminetetraacetate disodium salt, and the like) and the like.

Examples of a moisturizing agent which is not an organic solvent include moisturizing agents which are solid at room temperature, such as trimethylolpropane and sugar.

1.2.7. Method for Preparing Aqueous Ink Jet Ink Composition

In the present embodiment, the aqueous ink jet ink composition is obtained by mixing the components described above in an arbitrary order and, as necessary, removing impurities by filtration or the like. As a method of mixing the respective components, a method is suitably used in which materials are sequentially added to a container provided with a stirrer such as a mechanical stirrer, a magnetic stirrer and the like, and stirred and mixed. As a filtration method, it is possible to carry out centrifugal filtration, filter filtration and the like as necessary.

1.2.8. Physical Properties of Aqueous Ink Jet Ink Composition

In the aqueous ink jet ink composition of the present embodiment, from the viewpoint of balance between image quality and reliability as ink for ink jet recording, the surface tension at 20° C. is preferably 18 mN/m or more and 40 mN/m, more preferably 20 mN/m or more and 35 mN/m or less, and even more preferably 22 mN/m or more and 33 mN/m or less. For the measurement of the surface tension, for example, it is possible to carry out measurement by confirming the surface tension when a platinum plate is wetted with ink in an environment of 20° C. using an automatic surface tensiometer CBVP-Z (trade name, manufactured by Kyowa Interface Science Co., Ltd.).

The absolute value of the difference in surface tension between the aqueous ink jet ink composition and the reaction liquid described below is preferably 10 or less, more preferably 8 or less, and even more preferably 7 or less. The absolute value of the difference in surface tension between the aqueous ink jet ink composition and the reaction liquid being 10 or less secures the wettability at the time of recording, thus it is possible to perform recording excellent in image quality.

In addition, from the same viewpoint, the viscosity of the aqueous ink jet ink composition according to the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Physica) under an environment of 20° C.

In addition, in the aqueous ink jet ink composition according to the present embodiment, the conductivity of the ink composition is 2600 μs/cm or less. In the present embodiment, the conductivity of the ink composition being 2600 μs/cm or less makes it possible to provide an aqueous ink jet ink composition having excellent storage stability while securing printing quality during fine line printing. In addition, the conductivity of the ink composition being 2600 μs/cm or less makes the dispersion stability of the ink component excellent, thus it is possible to obtain an ink excellent in ejection stability.

The lower limit of the conductivity of the ink composition is not limited, but is 0 μs/cm or more, preferably 100 μs/cm or more, more preferably 500 μs/cm or more, even more preferably 700 μs/cm or more, still more preferably 850 μs/cm or more, and particularly preferably 1000 μs/cm or more. In addition, the upper limit of the conductivity of the ink composition is preferably 2450 μs/cm or less, more preferably 2200 μs/cm or less, and even more preferably 2000 μs/cm or less. The conductivity of the ink composition being in the above range makes it possible to obtain an aqueous ink jet ink composition which is superior in ejection stability and storage stability.

Here, it is possible to measure the conductivity of the ink composition, for example, using a conductivity meter (EC Tester 11+manufactured by Eutech Instruments).

It is possible to adjust the conductivity of the ink composition, for example, by adjusting the kind of the component having conductivity out of the components contained in the ink composition and the content in the ink composition. Examples of components having conductivity include a pigment dispersion, a resin dispersion, and the like. It is possible to adjust the conductivity of the pigment dispersion by adjusting the degree of the treatment when surface treatment for introducing ionic functional groups to the surface of the pigment dispersion is carried out or adjusting the amount of ionic functional groups of the dispersant resin used for pigment dispersion. It is possible to adjust the conductivity of the resin dispersion by adjusting the amount of the ionic functional group of the resin forming the resin dispersion or by adjusting the amount of the ionic functional group of the dispersant used for dispersing the resin dispersion. Examples of components having conductivity include a compound having an ionic functional group.

1.3. Reaction Liquid

Next, a description will be given of the reaction liquid used in the ink jet recording method. The reaction liquid used in the present embodiment contains an aggregating agent for aggregating the components of the aqueous ink jet ink composition. A detailed description will be given below of components which are included and components which are able to be included in the reaction liquid used in the present embodiment.

Here, in the present embodiment, the reaction liquid is an auxiliary liquid which contains a coloring material in an amount of 0.2% by mass or less and which is attached to the recording medium and used before attaching the aqueous ink jet ink composition, and the reaction liquid is not the aqueous ink jet ink composition described above used for coloring a recording medium.

1.3.1. Aggregating Agent

The reaction liquid used in the present embodiment contains an aggregating agent for aggregating the components of the ink composition. Due to the reaction liquid including an aggregating agent, in the ink attaching step described below, the aggregating agent and the resin included in the aqueous ink jet ink composition react promptly. Then, the dispersed state of the surface-treated pigment or resin having the phosphorus-containing group on the surface thereof in the aqueous ink jet ink composition is destroyed, and the surface-treated pigment and the resin are aggregated. Since this aggregate inhibits permeation of the surface-treated pigment into the recording medium, it is considered that the aggregate will be excellent in terms of improving the image quality of the recorded image.

Examples of aggregating agents include a polyvalent metal salt, a cationic polymer, a cationic surfactant, and an organic acid. These aggregating agents may be used alone or in a combination of two or more. Among these aggregating agents, it is preferable to use at least one kind of aggregating agent selected from the group formed of a polyvalent metal salt and a cationic polymer from the viewpoint of excellent reactivity with the resin contained in the aqueous ink jet ink composition.

The polyvalent metal salt is formed of divalent or higher polyvalent metal ions and anions bonded to these polyvalent metal ions, and is a compound soluble in water. Specific examples of polyvalent metal ions include divalent metal ions such as $Ca^{2+}$, $Cu^{2+}$, $Ni^{2+}$, $Mg^{2+}$, $Zn^{2+}$, $Ba^{2+}$, and the like; and trivalent metal ions such as $Al^{3+}$, $Fe^{3+}$, and $Cr^{3+}$. Examples of anions include $Cl^-$, $I^-$, $Br^-$, $SO_4^{2-}$, $ClO^{3-}$, $NO^{3-}$, and $HCOO^-$, $CH_3COO^-$, and the like. Among these polyvalent metal salts, calcium salts and magnesium salts are preferable from the viewpoints of stability of the reaction liquid and reactivity as an aggregating agent.

Preferable example of organic acids include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, a derivative of these compounds, or a salt thereof, and the like. One kind of organic acid may be used alone, or two or more kinds may be used in combination.

Examples of cationic polymers include a cationic urethane resin, a cationic olefin resin, a cationic allylamine resin, and the like.

As the cationic urethane resin, it is possible to appropriate select and use known resins. It is possible to use commercial products as the cationic urethane resins and, for example, it is possible to use Hydran CP-7010, CP-7020, CP-7030, CP-7040, CP-7050, CP-7060, and CP-7610, (the above are all trade names, manufactured by Dainippon Ink & Chemicals, Inc.), Superflex 600, 610, 620, 630, 640, and 650 (the above are all trade names, manufactured by Dai-ichi Kogyo Seiyaku Co., Ltd.), urethane emulsion WBR-2120C, and WBR-2122C, (the above are all trade names, manufactured by Taisei Fine Chemical Co., Ltd.), and the like.

The cationic olefin resin has an olefin such as ethylene, propylene or the like in the structural skeleton thereof, and it is possible to appropriately select and use known resins. In addition, the cationic olefin resin may be in an emulsion state of being dispersed in a solvent including water, an organic solvent, or the like. As the cationic olefin resin, it is possible to use commercial products and examples thereof include Arrow Base CB-1200, CD-1200 (the above are all trade names, manufactured by Unitika Ltd.), and the like.

It is possible to appropriately select and use known resins as the cationic allylamine resins, and examples thereof include polyallylamine hydrochloride, polyallylamine amide sulfate, allylamine hydrochloride-diallylamine hydrochloride copolymer, allylamine acetate-diallylamine acetate salt copolymer, allylamine hydrochloride-dimethylallylamine hydrochloride copolymer, allylamine-dimethylallylamine copolymer, polydiallylamine hydrochloride, polymethyldiallylamine hydrochloride, polymethyldiallylamine amide sulfate, polymethyldiallylamine acetate salt, polydiallyldimethylammonium chloride, diallylamine acetate-sulfur dioxide copolymer, diallylmethylethylammoniumethylsulfate-sulfur dioxide copolymers, methyl diallyl amine hydrochloride-sulfur dioxide copolymers, diallyldimethylammonium chloride-sulfur dioxide copolymers, diallyldimethylammonium chloride-acrylamide copolymer, and the like. It is possible to use commercial products such as cationic allylamine resins and, for example, it is possible to use PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (the above are all trade names, manufactured by Nittobo Medical Co., Ltd), Haimo Neo-600, Himoloc Q-101, Q-311, Q-501, and High Max SC-505, (the above are all trade names, Haimo Co., Ltd.), or the like.

Examples of cationic surfactants include primary, secondary, and tertiary amine salt type compounds, alkylamine salts, dialkylamine salts, aliphatic amine salts, benzalkonium salts, quaternary ammonium salts, quaternary alkyl ammonium salts, alkyl pyridinium salts, sulfonium salts, phosphonium salts, onium salts, imidazolinium salts, and the like. Specific examples of cationic surfactants include hydrochloric acids such as laurylamine, Coco amine, and rosinamine, acetates, and the like, lauryltrimethylammonium chloride, cetyltrimethylammonium chloride, benzyltributylammonium chloride, benzalkonium chloride, dimethylethyl lauryl ammonium chloride ethyl sulfate, dimethyl ethyl octyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexa decyl dimethyl ammonium chloride, octadecyl dimethyl ammonium chloride, and the like.

The concentration of the aggregating agent in the reaction liquid may be 0.03 mol/kg or more in 1 kg of the reaction liquid. In addition, in the reaction liquid, the concentration may be 0.1 mol/kg or more and 1.5 mol/kg or less, and may be 0.2 mol/kg or more and 0.9 mol/kg or less in 1 kg. In addition, the content of the aggregating agent may be 0.1% by mass or more and 25% by mass or less with respect to the total mass (100% by mass) of the reaction liquid, may be 1% by mass or more and 20% by mass or less, and may be 3% by mass or more and 10% by mass or less.

1.3.2. Water

The reaction liquid used in the present embodiment is preferably an aqueous reaction liquid with water as the main solvent. This water is a component which is evaporated and scattered by drying after attaching the reaction liquid to the recording medium. As the water, water is preferable in which ionic impurities are removed as much as possible like pure water or ultrapure water such as ion-exchanged water, ultra-filtered water, reverse osmosis water, and distilled water. In addition, the use of water sterilized by ultraviolet ray irradiation or addition of hydrogen peroxide or the like is suitable since it is possible to prevent generation of fungi and bacteria when the reaction liquid is stored for a long time. It is possible to set the content of water included in the reaction liquid based on the total mass (100% by mass) of the reaction liquid to, for example, 40% by mass or more, preferably 20% by mass or more, more preferably 30% by mass or more, and more preferably 40% by mass or more.

1.3.3. Organic Solvent

The reaction liquid used in the present embodiment may contain an organic solvent. Containing an organic solvent makes it possible to improve the wettability of the reaction liquid to the recording medium. As the organic solvent, it is possible to use the same organic solvents as those exemplified for the aqueous ink jet ink composition. The content of the organic solvent is not particularly limited, but it is possible to set the content to, for example, 10% by mass or more and 80% by mass or less with respect to the total mass (100% by mass) of the reaction liquid, and preferably 15% by mass or more and 70% by mass or less.

It is possible to contain the standard boiling point of the organic solvent in the preferable temperature range of the standard boiling point of the organic solvent which may be contained in the ink composition described above, independently of the standard boiling point of the organic solvent which may be contained in the ink composition. Alternatively, the standard boiling point of the organic solvent is preferably 180° C. or higher, more preferably 180° C. or higher and 300° C. or lower, even more preferably 190° C. or higher and 270° C. or lower, and particularly preferably 200° C. or higher and 250° C. or lower.

Here, in the reaction liquid, as the organic solvent, in the same manner as the aqueous ink jet ink composition described above, the content of the water-soluble organic solvent having a standard boiling point of higher than 280° C. is preferably 5% by mass or less, more preferably 3% by mass or less, even more preferably 2% by mass or less, yet more preferably 1% by mass or less, and even more preferably 0.5% by mass or less. In such a case, since the drying property of the reaction liquid is good, not only is drying of the reaction liquid quickly performed, but the obtained recorded matter is excellent in tackiness reduction and abrasion resistance.

1.3.4. Surfactant

A surfactant may be added to the reaction liquid used in the present embodiment. Adding the surfactant makes it possible to lower the surface tension of the reaction liquid and to improve the wettability with the recording medium. Among the surfactants, for example, it is possible to preferably use an acetylene glycol-based surfactant, a silicone-based surfactant, or a fluorine-based surfactant. As specific examples of these surfactants, it is possible to use the same surfactants as exemplified for the aqueous ink jet ink composition described below. The content of the surfactant is not particularly limited, but it is possible to set the content to be 0.1% by mass or more and 5% by mass or less with respect to the total mass (100% by mass) of the reaction liquid.

1.3.5. Other Components

The pH adjusting agent, preservative/fungicide, rust inhibitor, and chelating agent as described above may be added to the reaction liquid used in the present embodiment, as necessary.

1.3.6. Method of Preparing Reaction Liquid

It is possible to manufacture the reaction liquid used in the present embodiment by dispersing and mixing the above-mentioned respective components by an appropriate method. After thoroughly stirring each of the above components, filtration is carried out in order to remove coarse particles and foreign matter which cause clogging to obtain the desired reaction liquid.

1.3.7. Physical Properties of Reaction Liquid

In a case where the reaction liquid used in the present embodiment is ejected from an ink jet head, the surface tension at 20° C. is preferably 18 mN/m or more and 40 mN/m or less, more preferably 20 mN/m or more and 35 mN/m or less, and even more preferably 22 mN/m or more and 33 mN/m or less. For the measurement of the surface tension, for example, it is possible to carry out measurement by confirming the surface tension when a platinum plate is wetted with the reaction liquid in an environment of 20° C. using an automatic surface tensiometer CBVP-Z (trade name, manufactured by Kyowa Interface Science Co., Ltd.).

The absolute value of the difference in surface tension between the aqueous ink jet ink composition and the reaction liquid is preferably 10 or less, more preferably 8 or less, and even more preferably 7 or less. The wettability at the time of recording is secured by the absolute value of the difference in surface tension between the aqueous ink jet ink composition and the reaction liquid being 10 or less, thus it is possible to perform recording excellent in image quality.

In addition, from the same viewpoint, the viscosity of the reaction liquid used in the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Physica) under an environment of 20° C.

1.4. Recording Medium

The aqueous ink jet ink composition described above has an ink drying property and it is possible to obtain an image excellent in image quality and abrasion resistance in recording on recording media with an ink absorbing property or an ink non-absorbing property or low ink absorbing property. In particular, it is possible to preferably use the aqueous ink jet ink composition described above which is able to obtain an image excellent in abrasion resistance in recording on recording media with an ink non-absorbing property or low ink absorbing property.

Examples of recording media with an ink absorbing property include plain paper such as high-quality paper and recycled paper, ink jet specialty paper provided with an ink receiving layer having an ink absorbing property, and the like.

Examples of recording media with an ink non-absorbing property include a plastic film which is not surface-treated for ink jet recording (that is, on which an ink absorbing layer is not formed), a recording medium where plastic is coated on a base material such as paper, a recording medium to which a plastic film is bonded, or the like. Examples of plastics here include polyvinyl chloride, polyethylene terephthalate, polycarbonate, polystyrene, polyurethane, polyethylene, polypropylene, and the like. Examples of recording media with a low ink absorbing property include printing paper such as art paper, coated paper, and matte paper. In the present specification, a recording medium with an ink non-absorbing property or with a low ink absorbing property is also referred to simply as a "plastic medium".

Here, the "recording medium with an ink non-absorbing property or with a low ink absorbing property" in the present specification means a "recording medium having a water absorption amount of 10 mL/m$^2$ or less from the start of contact to 30 msec$^{1/2}$ in the Bristow method". This Bristow method is the most popular method as a method for measuring the amount of liquid absorption in a short time and is also adopted by Japan Technical Association of the Pulp and Paper Industry (JAPAN TAPPI). The details of the test method are described in the standard No. 51 "Paper and paperboard-Liquid absorbing property test method-Bristow method" in "JAPAN TAPPI 2000 Paper Pulp Test Method".

Examples of recording media with an ink non-absorbing property include a plastic film which does not have an ink absorbing layer, a recording medium in which plastic is applied on a base material such as paper, a recording medium having a plastic film adhering thereto, and the like. Examples of plastics here include polyvinyl chloride, polyethylene terephthalate, polycarbonate, polystyrene, polyurethane, polyethylene, polypropylene, and the like.

Examples of recording media with a low ink absorbing property include a recording medium provided with a coating layer for receiving ink on the surface thereof, for example, in a case of a recording medium where the base material is paper, examples include printing paper such as art paper, coated paper, and matte paper, in a case of a recording medium where the base material is a plastic film, examples include recording media in which a hydrophilic polymer is coated on the surface of polyvinyl chloride, polyethylene terephthalate, polycarbonate, polystyrene, polyurethane, polyethylene, polypropylene or the like, or recording media in which particles such as silica or titanium are coated with a binder. These recording media may be transparent recording media.

In addition, it is possible to suitably use the above for recording medium with an ink non-absorbing property or a low ink absorbing property having irregularities on the surface thereof such as embossed media.

Here, in a case where the ink jet recording apparatus 1 is a serial type (multi-pass type) recording apparatus, the width of the recording medium width is preferably 3.2 m or less. In such a case, the time during which the recording medium opposes the ink jet head during one main scan, that is, the time during which the nozzles not used during one scan receive heat from the recording medium is 12 seconds or less, it is possible to suppress drying and composition variations of the ink composition in the nozzles, and it is possible to reduce the deposition of the resin on the inner wall of the nozzle. As a result, it is possible to suppress landing deviation of the ink during continuous printing, and the clogging recoverability of the nozzle is also good. Here, the lower limit of the preferable recording medium width is 30 cm or more.

2. Ink Jet Recording Method

The ink jet recording method according to the present embodiment is provided with an ink attaching step of ejecting the aqueous ink jet ink composition from the ink jet head and attaching the ink composition to the recording medium. A description will be given below with reference to the drawings.

2.1. Reaction Liquid Attachment Step

The reaction liquid attachment step is a step of attaching a reaction liquid including an aggregating agent for aggregating the components of the aqueous ink jet ink composition on the recording medium. Attaching a reaction liquid containing an aggregating agent for aggregating the components of the ink composition prior to attaching of the aqueous ink jet ink composition to the recording medium makes it possible to suppress bleeding of the ink and to perform recording excellent in abrasion resistance and image quality.

It is preferable that the recording medium M be heated by the preheater 7 shown in FIG. 1 before the reaction liquid attaching step or by the IR heater 3 or the platen heater 4 shown in FIG. 1 at the time of the reaction liquid attaching step. By allowing the reaction liquid to attach to the heated recording medium M, the reaction liquid ejected onto the recording medium M spreads easily on the recording medium M, and it is possible to uniformly apply the reaction liquid. Therefore, the ink attached in the ink attaching step described below reacts sufficiently with the reaction liquid, and excellent image quality is able to be obtained. In addition, since the reaction liquid is uniformly coated on the recording medium M, it is possible to reduce the coating amount and to prevent a reduction in abrasion resistance of the obtained image.

Here, it is possible to set the surface temperature of the recording medium M at the time of attaching the reaction liquid independently of the surface temperature (primary heating temperature) of the recording medium M when attaching the ink, in the preferable temperature range of the surface temperature (primary heating temperature) of the recording medium M when attaching the ink described below. In a case where the temperature of the recording medium M at the time of attaching the reaction liquid is in the above range, it is possible to uniformly coat the reaction liquid on the recording medium M, and to improve the image quality. In addition, it is possible to suppress the influence of heat on the ink jet head 2.

Here, attachment of the reaction liquid may be performed by ejection by the ink jet head 2, and examples of other methods include a method of coating the reaction liquid with a roll coater or the like, a method of ejecting the reaction liquid, and the like.

2.2. Ink Attaching Step

The ink attaching step is a step of ejecting the aqueous ink jet ink composition described above from the ink jet head 2 onto the recording medium M or onto the recording medium M subjected to the reaction liquid attachment step and attaching the ink composition thereto. Through this step, the ink droplets and the reaction liquid react on the recording medium M. Due to this, an image formed of the ink composition is formed on the surface of the recording medium M. In addition, by the reaction liquid containing the aggregating agent, the aggregating agent reacts with the components of the ink on the recording medium M, making it possible to obtain an ink with superior the abrasion resistance.

Here, in the present embodiment, "image" indicates a recording pattern formed from a group of dots, including text printing and solid images. Here, "solid image" means an image pattern in which dots are recorded in all pixels of the pixels which are the minimum recording unit region defined by a recording resolution, and in which the recording region of the recording medium is normally covered with ink and the base of the recording medium is not visible.

In the present embodiment, the ink attaching step heating step may be performed simultaneously with the reaction liquid attachment step.

The maximum attached amount of the aqueous ink jet ink composition per unit area on the recording medium M is preferably 5 mg/inch$^2$ or more, more preferably 7 mg/inch$^2$ or more, and even more preferably 10 mg/inch$^2$ or more. The upper limit of the attachment amount of the aqueous ink jet ink composition per unit area of the recording medium is not particularly limited, but is preferably 20 mg/inch$^2$ or less, preferably 15 mg/inch$^2$ or less, and particularly preferably 13 mg/inch$^2$ or less.

The ink attaching step may be provided with a heating step of heating the recording medium M with the IR heater 3 or the platen heater 4 at the same time as the ink attaching step or before the ink attaching step, and the ink attaching step is preferably performed on the recording medium M heated by the heating step. Due to this, it is possible to quickly dry the ink on the recording medium M, and bleeding is suppressed. In addition, it is possible to form an image excellent in abrasion resistance and image quality, and using the ink described above makes it possible to provide an ink jet recording method excellent in ejection stability.

The surface temperature (primary heating temperature) of the recording medium M at the time of attaching the ink is preferably 60° C. or lower, more preferably 55° C. or lower, even more preferably 45° C. or lower, still more preferably 40° C. or lower, and yet more preferably 38° C. or lower. The surface temperature of the recording medium at the time of attaching the ink being within the above range makes it possible to suppress the influence of heat on the ink jet head 2 and to prevent clogging of the nozzle. In addition, the lower limit of the surface temperature of the recording medium M at the time of ink jet recording is preferably 25° C. or higher, more preferably 30° C. or higher, even more preferably 32° C. or higher, and particularly preferably 35° C. or higher. The surface temperature of the recording medium M during ink jet recording being in the range described above makes it possible to quickly dry the ink on the recording medium M, to suppress bleeding, and to form an image excellent in abrasion resistance.

Here, in a case where the ink jet recording apparatus 1 is a serial type recording apparatus, it is preferable that the time during which the recording medium opposes the ink jet head 2 during one main scanning be 12 seconds or less. The upper limit of this time is more preferably 10 seconds or less, and particularly preferably 6 seconds or less. The lower limit of this time is preferably second or more, more preferably 2 seconds or more, even more preferably 3 seconds or more, and particularly preferably 4 seconds or more. The time during which the recording medium M opposes the ink jet head 2 during one main scan is equal to the time during which a nozzle not used during one scan receives heat from the recording medium M. In other words, if the time is within the above range, since the time during which the nozzles not used during one main scan receive heat from the recording medium M is sufficiently short, it is possible to suppress the drying and composition variation of the ink composition in the nozzle and to reduce the deposition of the resin on the inner wall of the nozzles. As a result, it is possible to suppress landing deviation of the ink during continuous printing and the clogging recoverability of the nozzle is further improved. In addition, in a case where the time described above is the above range or more, it is preferable in terms of being able to record on a recording medium having a long recording medium scanning width and in terms of designing the recording apparatus easily, and even in the case of performing such recording, the present embodiment is particularly useful in terms of being able to obtain ejection reliability.

2.3. Secondary Heating Step

The ink jet recording method according to the present embodiment may have a secondary heating step of heating the recording medium M to which the aqueous ink jet ink composition is attached by the curing heater 5 shown in FIG. 1 after the ink attaching step. Due to this, the fine resin particles included in the aqueous ink jet ink composition on the recording medium M are melted to form an ink film. In this manner, the ink film firmly fixes (adheres) to the recording medium M, and it is possible to obtain a high-quality image excellent in abrasion resistance in a short time.

The temperature (secondary heating temperature) at which the surface of the recording medium M is heated by the curing heater 5 is preferably 40° C. or higher and 120° C. or lower, more preferably 60° C. or higher and 100° C. or lower, and even more preferably 80° C. or higher and 90° C. or lower. The heating temperature being within the above range further improves the abrasion resistance of the obtained recorded matter and makes it possible to form an ink film on the recording medium M with high adhesion.

Here, after the secondary heating step, there may be a step of cooling the ink composition on the recording medium M using the cooling fan 6 shown in FIG. 1.

2.4. Cleaning Step

The ink jet recording method according to the present embodiment may be provided with a cleaning step of discharging the ink composition and the reaction liquid by a unit other than a pressure generating unit for recording by ejecting ink, that is, by a mechanism other than the mechanism for ejecting ink for recording provided in the ink jet head 2.

Examples of mechanisms for ejecting ink for recording provided in the ink jet head 2 include a piezo element provided in a pressure chamber and applying pressure to the ink and a heater element. The cleaning step may be a step of externally applying pressure to the ink jet head 2 to discharge the aqueous ink composition from the nozzle. By providing this step, even in a case where there is a concern that the resin will be deposited on the inner wall of the ink jet head 2, it is possible to suppress the deposition and to further improve the clogging property.

In addition, in the ink jet recording method according to the present embodiment, it is preferable to control the ink jet recording apparatus 1 so as to perform recording for one hour or longer without performing the above cleaning step, that is, without cleaning. By carrying out the control in this manner, there is no reduction in the recording speed due to interruption of recording due to the cleaning step. In addition, in the present embodiment, even in the case of not carrying out cleaning, using the ink composition described above makes it possible to suppress clogging of the ink jet head 2 and to record a good image excellent in abrasion resistance.

Here, examples of the other mechanisms described above include a mechanism for applying pressure such as application of suction (negative pressure) or the application of positive pressure from the upstream of the head. These mechanisms are not ink discharging (flushing) using the function of the ink jet head itself. In other words, these mechanisms are not discharging using the function of ejecting ink from the ink jet head in recording.

In addition, the recording time may not be continuous, and recording may be paused unless pressure is externally applied to the ink jet head to discharge the aqueous ink composition from the nozzle. Here, the recording time is the time required for recording including the scanning and the stop time between scanning. The recording time is preferably 1 hour or more, more preferably 1.5 hours or longer, even more preferably 2 hours or longer, and particularly preferably 3 hours or longer. The upper limit of the recording time is not limited, but is preferably 10 hours or shorter, more preferably 5 hours or shorter, and even more preferably 4 hours or shorter.

In addition, the ink jet recording method according to the present embodiment is preferable in the point described above that, when performing recording one time, the cleaning step described above is not performed during recording. In addition, even if the above-described cleaning step is performed at least either before recording or after recording, it is preferable in view of the point described above.

As described above, in the ink jet recording method according to the present embodiment, setting the conductivity of the ink within a predetermined range makes the dispersion stability of the ink component excellent, thus it is possible to provide a recording method excellent in ejection stability. In addition, since the ink permeability to a recording medium and the affinity with a recording medium are good, unintentional bleeding and spreading of ink on the recording medium is suppressed, printing quality during fine line printing is secured, and it is possible to obtain an image excellent in abrasion resistance. Furthermore, in a recording apparatus which performs recording using the ink jet recording method according to the present embodiment, in particular, it is possible to realize ink jet recording excellent in ejection stability for one hour or longer without performing a cleaning step. In addition, it is possible to provide a recording apparatus for recording and controlling the recording described above.

3. Examples

A more specific description will be given below of embodiments of the invention with reference to Examples and Comparative Examples, but the present embodiment is not limited to only these Examples.

3.1. Ink
3.1.1. Preparation of Pigment Dispersion
The following pigment dispersions 1 to 5 were used.

TABLE 1

| | Dispersion Form | Modifying Functional Group | Pigment 1% Conductivity |
|---|---|---|---|
| Pigment Dispersion 1 | Self-dispersion | Phosphonic acid group | 120 |
| Pigment Dispersion 2 | Self-dispersion | Carboxylic acid group | 325 |
| Pigment Dispersion 3 | Self-dispersion | Sulfonic acid group | 54 |
| Pigment Dispersion 4 | Resin dispersion | — | 631 |
| Pigment Dispersion 5 | Self-dispersion | Phosphonic acid group | 135 |

Pigment Dispersion 1

The following procedure was used to produce [2-(4-aminophenyl)-1-hydroxyethane-1,1-diyl] bisphosphonic acid monosodium salt. A 500 mL three-necked flask was fitted with a condenser provided with a gas outlet at the top of the condenser, a thermometer, and a dry nitrogen inlet, as well as a 100 mL pressure equalizing addition funnel. 32 g of phosphorous acid (380 mmol) and 160 mL of methanesulfonic acid (solvent) were initially added to the flask. 57.4 g of aminophenylacetic acid (380 mmol) was added gradually to this stirred mixture. The stirred mixture was heated to 65° C. for 1 to 2 hours to completely dissolve the solids. The whole system was flushed with dry nitrogen and the temperature was reduced to 40° C. after all of the solids had dissolved. 70 mL of $PCl_3$ (800 mmol) was slowly added through the addition funnel to this heated solution. HCl gas was generated from the reaction and this gas flowed through the gas outlet into the drying tube and then through the funnel into the concentrated NaOH solution in the beaker. After the addition was completed, the reaction mixture was stirred for 2 hours and heated at 40° C. After this time, the temperature was raised to 65 to 70° C. and the mixture was stirred overnight. The resulting clear brown solution was cooled to room temperature and then quenched by addition to 600 g of an ice/water mixture. This aqueous mixture was placed in a 1 L beaker and heated to 90 to 95° C. for 4 hours (the top of the beaker was covered with a glass plate). Next, this mixture was cooled to room temperature and the pH of the mixture was adjusted to 4 to 5 with 50% NaOH solution (since the temperature increases as a result of quenching, the NaOH solution was slowly added). The mixture was cooled to 5° C. in an ice bath for 2 hours and then the resulting solid was collected by suction filtration, washed with 1 L of cold deionized water, and dried at 60° C. overnight to obtain a white or off-white color solid product (yield 48 g, 39%). In this manner, [2-(4-aminophenyl)-1-hydroxyethane-1,1-diyl] bisphosphonic acid monosodium salt was obtained.

Next, 20 g of the pigment (carbon black), 20 mmol of the compound obtained above, and 20 mmol of nitric acid were added to 200 ml of deionized water, and the mixture was stirred at 6000 rpm for 30 minutes. Next, 20 mmol of sodium nitrite was slowly added to the mixed solution, and the mixture was stirred for one hour in the same manner as described above. The pH of the resulting mixture was adjusted to 10 using 50% NaOH solution. After 30 minutes, the formed modified pigment was filtered with deionized water to obtain a pigment dispersion liquid in which the pigment solid content was adjusted to 12% by mass. The obtained pigment had a phosphonic acid group on the surface thereof.

Pigment Dispersion 2
Cab-O-Jet 300 manufactured by Cabot Corporation was used.

Pigment Dispersion 3

Cab-O-Jet 200 manufactured by Cabot Corporation was used.

Pigment Dispersion 4

3.0 g of a styrene-acrylic acid polymer dispersant (manufactured by BASF Japan Ltd., Joncryl 682) and 1.8 g of triethanolamine were dissolved in 80.1 g of ion-exchanged water, 15 g of carbon black and 0.1 g of an antifoaming agent (Surfynol 104E, manufactured by Nissin Chemical Industry Co., Ltd.) were added thereto and dispersed with a paint shaker using zirconia beads to obtain a pigment dispersion P-4 (black).

Pigment Dispersion 5

[2-(4-aminophenyl)-1-hydroxypropane-1,1-diyl] bisphosphonic acid monosodium salt was obtained by the procedure described in pigment dispersion 1 except that, in the preparation of the above pigment dispersion 1, 4-aminophenyl-propionic acid produced by the hydrogenation of 4-nitro-cinnamic acid was used in place of aminophenylacetic acid. A pigment dispersion liquid including a surface-treated carbon black pigment was obtained in the same manner as in pigment dispersion 1, except that the above compound was used in the treatment. The obtained pigment had a phosphonic acid group on the surface thereof.

3.1.2. Resin Emulsion

The resin emulsions shown in Table 2 were used.

TABLE 2

| | Trade name | Maker | Pigment 1% conductivity |
|---|---|---|---|
| Resin emulsion 1 | VONCOAT SA-6360 | DIC Corporation | 134 |
| Resin emulsion 2 | JONCRYL HRC-1645J | BASF SE | 293 |
| Resin emulsion 3 | JONCRYL 527J | BASF SE | 515 |
| Resin emulsion 4 | JONCRYL 7001 | BASF SE | 1099 |

3.1.3. Ink Preparation

Inks 1 to 14 (Examples and Comparative Examples) were obtained by mixing and stirring each component so as to obtain the blending ratios in Table 3. The numerical values in Table 3 all indicate % by mass, and pure water was added thereto such that the total mass of the ink was 100% by mass. In addition, the pigment dispersion and the resin emulsion are values in terms of solid content. Here, the content of the pigment dispersion or resin dispersion was adjusted as necessary such that the measured value of the conductivity of the ink after preparation was the value described in Table 3.

TABLE 3

| | | Standard boiling point of organic solvent (°C.) | Examples | | | | | | |
|---|---|---|---|---|---|---|---|---|---|
| | | | Ink 1 | Ink 2 | Ink 3 | Ink 4 | Ink 5 | Ink 6 | Ink 7 |
| Pigment Dispersion | Pigment Dispersion 1 | | 6 | 6 | 6 | 6 | 3 | 6 | |
| | Pigment Dispersion 2 | | | | | | | | |
| | Pigment Dispersion 3 | | | | | | | | |
| | Pigment Dispersion 4 | | | | | | | | |
| | Pigment Dispersion 5 | | | | | | | | 6 |
| Resin Dispersion | Resin EM 1 | | 6 | | 6 | 6 | 3 | 6 | 6 |
| | Resin EM 2 | | | 6 | | | | | |
| | Resin EM 3 | | | | | | | | |
| | Resin EM 4 | | | | | | | | |
| Organic solvent | Glycerine | 290 | 15 | 15 | | | 15 | | 15 |
| | 2-pyrrolidone | 245 | | | 15 | 15 | | | |
| | Diethylene glycol | 244 | 10 | 10 | 10 | 10 | 10 | 25 | 10 |
| | 1,2-hexanediol | 223 | 4 | 4 | 4 | 4 | 4 | 4 | 4 |
| Other | Trimethylol propane | | 5 | 5 | 5 | 5 | 5 | 5 | 5 |
| | Surfynol 465 | | 1 | 1 | 0.2 | | 1 | | 1 |
| | BYK348 | | | | 0.8 | | | | |
| | E1010 | | | | | 1 | | 1 | |
| | Water | | Remainder | Remainder | Remainder | Remainder | Remainder | Remainder | Remainder |
| | Total | | 100 | 100 | 100 | 100 | 100 | 100 | 100 |
| | Conductivity (μs/cm) | | 1524 | 2478 | 1524 | 1524 | 762 | 1524 | 1614 |
| | Surface Tension (mN/m) | | 29 | 30 | 25 | 35 | 29 | 35 | 27 |
| | Ink Storability | | A | B | A | A | A | A | A |
| | Printing Evaluation (fine line evaluation) | | A | A | A | A | A | A | A |

| | | Standard boiling point of organic solvent (°C.) | Comparative Examples | | | | | | |
|---|---|---|---|---|---|---|---|---|---|
| | | | Ink 8 | Ink 9 | Ink 10 | Ink 11 | Ink 12 | Ink 13 | Ink 14 |
| Pigment Dispersion | Pigment Dispersion 1 | | | | | 6 | 6 | 6 | |
| | Pigment Dispersion 2 | | 5 | | | | | | 3 |
| | Pigment Dispersion 3 | | | 6 | | | | | |

TABLE 3-continued

|  |  |  |  |  |  |  |  |  |  |
|---|---|---|---|---|---|---|---|---|---|
|  | Pigment Dispersion 4 |  |  |  | 3 |  |  |  |  |
|  | Pigment Dispersion 5 |  |  |  |  |  |  |  |  |
| Resin Dispersion | Resin EM 1 |  | 6 | 6 | 3 |  |  |  | 2 |
|  | Resin EM 2 |  |  |  |  | 8 |  |  |  |
|  | Resin EM 3 |  |  |  |  |  | 6 |  |  |
|  | Resin EM 4 |  |  |  |  |  |  | 6 |  |
| Organic solvent | Glycerine | 290 | 15 | 15 | 15 | 15 | 15 | 15 | 15 |
|  | 2-pyrrolidone | 245 |  |  |  |  |  |  |  |
|  | Diethylene glycol | 244 | 10 | 10 | 10 | 10 | 10 | 10 | 10 |
|  | 1,2-hexanediol | 223 | 4 | 4 | 4 | 4 | 4 | 4 | 4 |
| Other | Trimethylol propane |  | 5 | 5 | 5 | 5 | 5 | 5 | 5 |
|  | Surfynol 465 |  | 1 | 1 | 1 | 1 | 1 | 1 | 1 |
|  | BYK348 |  |  |  |  |  |  |  |  |
|  | E1010 |  |  |  |  |  |  |  |  |
|  | Water |  | Remainder | Remainder | Remainder | Remainder | Remainder | Remainder | Remainder |
|  | Total |  | 100 | 100 | 100 | 100 | 100 | 100 | 100 |
|  | Conductivity (μs/cm) |  | 2429 | 1128 | 2296 | 3064 | 3810 | 7314 | 1243 |
|  | Surface Tension (mN/m) |  | 33 | 28 | 31 | 30 | 32 | 28 | 33 |
|  | Ink Storability |  | B | A | B | C | C | C | B |
|  | Printing Evaluation (fine line evaluation) |  | B | C | B | A | A | A | B |

The details of the substances described by the trade names in Table 3 are as follows.

Surfactant

Surfynol 465 (trade name "Surfynol DF 110D", acetylene glycol-based surfactant, manufactured by Nissin Chemical Industry Co., Ltd.)

BYK348 (trade name, silicone-based surfactant, manufactured by BYK Additives & Instruments,)

E1010 (trade name "Olfine E1010", acetylene glycol-based surfactant, manufactured by Nissin Chemical Industry Co., Ltd.)

3.1.4. Evaluation of Ink

An ink storability test and printing evaluation were performed on the obtained inks 1 to 14 and the conductivity and surface tension of the ink were measured. The results are listed in Table 3.

Ink Storability Test

The ink composition was placed in a glass bottle so as to be 80% full, held in a constant temperature environment at 70° C. for 3 days, and the viscosity and particle size change before and after storage were observed and evaluated according to the following criteria. Here, the change in viscosity was evaluated by measuring the viscosity of the ink at room temperature using a viscometer (product name "MCR-300" manufactured by Physica) and calculating the change in viscosity according to the following expression.

$$[(\text{viscosity after storage} - \text{initial viscosity})/(\text{initial viscosity})] \times 100(\%)$$

The particle size change is evaluated by measuring the volume average diameter (MV) in the particle size distribution in the ink before and after storage, and calculating the change in viscosity according to the following expression.

$$[(MV \text{ after storage} - \text{initial } MV)/(\text{initial } MV)] \times 100(\%)$$

For the measurement of the volume average diameter in the particle size distribution, a particle size distribution meter ("NANOTRAC UPA-EX 150" manufactured by Nikkiso Co., Ltd.) using the dynamic light scattering method as a measurement principle was used.

Evaluation Criteria

A: viscosity change≤20%, change in particle size≤30%

B: viscosity change≤20%, 30%<change in particle size≤50%

C: viscosity change>20%, change in particle size>50%

Evaluation of Printing (Fine Line Evaluation)

Ink was filled in an ink jet printer (product name "PX-G 930", manufactured by Seiko Epson Corporation), the Chinese character for "surprise" was printed at room temperature printing at 4 to 8 points with a dot weight of 8 ng, and 720×720 dpi resolution on high-quality paper (OK Prince fine quality: manufactured by Oji Paper Co., Ltd.), and it was visually observed and evaluated whether there was any character blurring or the like according to the following evaluation criteria. Here, "character blurring" means a state in which unintentional spreading of ink occurs on the paper surface, fine lines become thick, and it is not possible to determine the character.

Evaluation Criteria

A: No character blurring even at 4 points

B: Partial blurring at 4 to 5 points

C: Partial blurring at 6 to 8 points

Measurement of Conductivity

The conductivity was measured using a conductivity meter (EC Tester 11+manufactured by Eutech Instruments).

Measurement of Surface Tension

The surface tension was measured by confirming the surface tension when a platinum plate was wetted with ink in an environment of 20° C., using an automatic surface tensiometer CBVP-Z (trade name, manufactured by Kyowa Interface Science Co., Ltd.).

3.2. Preparation of Reaction Liquid

Reaction liquids 1 to 6 were prepared by mixing and stirring each component according to the composition shown in Table 4 and carrying out filtration through a 10 μm membrane filter. Here, all the numerical values in Table 4 indicate % by mass, and pure water was added thereto such that the total mass of the reaction liquid was 100% by mass. For each reaction liquid, the surface tension was measured in the same manner as for the inks described above.

TABLE 4

|  | Reaction Liquid 1 | Reaction Liquid 2 | Reaction Liquid 3 | Reaction Liquid 4 | Reaction Liquid 5 | Reaction Liquid 6 |
|---|---|---|---|---|---|---|
| Calcium acetate | 4 |  | 2 | 4 | 4 | 4 |
| Calcium pantothenate |  | 4.5 | 3 |  |  |  |
| 1,2-pentanediol | 40 | 40 | 40 | 40 | 40 | 40 |
| 1,3-propanediol | 30 | 30 | 30 |  |  |  |
| 1,2-propanediol (propylene glycol) | 10 | 10 | 10 |  |  |  |
| 2-pyrrolidone |  |  |  | 15 | 15 | 15 |
| Dynol 607 | 0.5 | 0.5 | 0.5 | 0.5 |  |  |
| BYK348 |  |  |  |  | 0.5 |  |
| E1010 |  |  |  |  |  | 0.5 |
| Water | Remainder | Remainder | Remainder | Remainder | Remainder | Remainder |
| Surface Tension (mN/m) | 34 | 33 | 32 | 30 | 27 | 36 |

The details of the substances described by the trade names in Table 4 are as follows.

Dynol 607 (trade name, acetylene diol-based surfactant, manufactured by Air Products Japan Co., Ltd.)

BYK348 (trade name, silicone-based surfactant, manufactured by BYK Additives & Instruments,)

E1010 (trade name "Olfine E1010" acetylene glycol-based surfactant, manufactured by Nissin Chemical Industry Co., Ltd.)

3.3. Evaluation Test of Ink Jet Recording Method 3.3.1. Ejection Reliability Test Recording was carried out continuously for 2 hours under the same conditions as the recording conditions of the image quality evaluation test described below. However, a blowing mechanism was provided in the ink jet printer, and the head was set in a state of being struck with blown air at 2 m/s in the direction opposite to the paper surface transport direction during recording. In addition, during the recording, a cleaning step using a mechanism other than a piezo element of the ink jet head, such as suction cleaning, was not performed. After recording, it was confirmed how many nozzles out of 360 nozzles were non-ejecting (defective) and evaluation was carried out according to the following criteria. After evaluation, when suction cleaning was performed to recover the non-ejecting nozzles, recovery was successful in all Examples.

Evaluation Criteria

A: the number of non-ejecting nozzles (missing nozzles) is 0

B: the number of non-ejecting nozzles is 1 to 5

C: the number of non-ejecting nozzles is 6 to 20

D: the number of non-ejecting nozzles is 21 or more 3.3.2. Image Quality Evaluation Test A recording medium was loaded into a remodeled machine of an ink jet printer (product name "SC-S 30650", manufactured by Seiko Epson Corporation), and the nozzles of one nozzle row of the head were filled with ink and reaction liquid, respectively. First, the reaction liquid was ink jet coated at a resolution of 1440×1440 dpi and an attachment amount of 1.0 mg/inch$^2$. Next, the recording medium was rewound and the ink was overlaid and ink jet coated on the reaction liquid layer at a resolution of 1440×1440 dpi and an attachment amount of 10.0 mg/inch$^2$. Here, a solid pattern of 10×10 mm was created, and the presence or absence of printing unevenness was visually confirmed and evaluated according to the following criteria.

When recording was performed, a platen heater was operated to allow the reaction liquid and ink to attach to the heated recording medium. At that time, the platen heater was controlled such that the surface temperature of the recording medium was the primary drying temperature described in Tables 5 to 7. After recording, the recording medium was discharged from the printer and dried at 80° C. for 5 minutes. As the recording medium, a polyvinyl chloride sheet (product number ORAJET 3164 XG-010 (1600 mm), glossy vinyl chloride with gray adhesive, manufactured by Orafol Co., Ltd.) was used.

In addition, the scanning time is the time during which the head and the recording medium oppose each other in one scanning. In some Examples, the scanning time was made different by adjusting the carriage speed.

Evaluation Criteria

A: The state in which the ink density is uneven in the pattern is not observed.

B: Small unevenness is recognized.

C: A high degree of unevenness is recognized but there is no pinhole.

D: Unevenness is recognized and there is a pinhole.

TABLE 5

|  | Examples |  |  |  |  |  |
|---|---|---|---|---|---|---|
|  | Recording Example 1 | Recording Example 2 | Recording Example 3 | Recording Example 4 | Recording Example 5 | Recording Example 6 |
| Ink | Ink 1 | Ink 2 | Ink 3 | Ink 4 | Ink 5 | Ink 6 |
| Reaction Liquid | Reaction Liquid 1 | Reaction Liquid 1 | Reaction Liquid 1 | Reaction Liquid 1 | Reaction Liquid 1 | Reaction Liquid 1 |
| Primary Heating Temperature (° C.) | 45 | 45 | 45 | 45 | 45 | 45 |
| Scanning Time (s) | 6 | 6 | 6 | 6 | 6 | 6 |
| Head | Head 1 | Head 1 | Head 1 | Head 1 | Head 1 | Head 1 |
| Reaction Liquid Surface Tension (mN/m) | 34 | 34 | 34 | 34 | 34 | 34 |

TABLE 5-continued

|  | | | | | | |
|---|---|---|---|---|---|---|
| Ink Surface Tension (mN/m) | 29 | 30 | 25 | 35 | 29 | 35 |
| Surface Tension Difference (mN/m) | 5 | 4 | 9 | −1 | 5 | −1 |
| Ejection Reliability | A | B | B | B | A | B |
| Image Quality Evaluation | A | A | B | A | B | A |
| Abrasion Resistance Evaluation | C | C | A | A | D | B |

|  | Examples | | | | |
|---|---|---|---|---|---|
|  | Recording Example 7 | Recording Example 8 | Recording Example 9 | Recording Example 10 | Recording Example 11 |
| Ink | Ink 7 | Ink 5 | Ink 1 | Ink 1 | Ink 1 |
| Reaction Liquid | Reaction Liquid 1 | Reaction Liquid 1 | Reaction Liquid 1 | Reaction Liquid 1 | Reaction Liquid 1 |
| Primary Heating Temperature (° C.) | 45 | 55 | 55 | 25 | 60 |
| Scanning Time (s) | 6 | 6 | 6 | 6 | 6 |
| Head | Head 1 | Head 1 | Head 1 | Head 1 | Head 1 |
| Reaction Liquid Surface Tension (mN/m) | 34 | 34 | 34 | 34 | 34 |
| Ink Surface Tension (mN/m) | 27 | 29 | 29 | 29 | 29 |
| Surface Tension Difference (mN/m) | 7 | 5 | 5 | 5 | 5 |
| Ejection Reliability | A | A | B | A | C |
| Image Quality Evaluation | B | A | A | B | A |
| Abrasion Resistance Evaluation | C | B | B | C | B |

TABLE 6

|  | Examples | | | | | |
|---|---|---|---|---|---|---|
|  | Recording Example 12 | Recording Example 13 | Recording Example 14 | Recording Example 15 | Recording Example 16 | Recording Example 17 |
| Ink | Ink 1 | Ink 1 | Ink 1 | Ink 1 | Ink 1 | Ink 1 |
| Reaction Liquid | Reaction Liquid 1 | Reaction Liquid 1 | Reaction Liquid 1 | Reaction Liquid 2 | Reaction Liquid 3 | Reaction Liquid 4 |
| Primary Heating Temperature (° C.) | 45 | 40 | 35 | 45 | 45 | 45 |
| Scanning Time (s) | 9 | 9 | 9 | 6 | 6 | 6 |
| Head | Head 1 | Head 1 | Head 1 | Head 1 | Head 1 | Head 1 |
| Reaction Liquid Surface Tension (mN/m) | 34 | 34 | 34 | 33 | 32 | 30 |
| Ink Surface Tension (mN/m) | 29 | 29 | 29 | 29 | 29 | 29 |
| Surface Tension Difference (mN/m) | 5 | 5 | 5 | 4 | 3 | 1 |
| Ejection Reliability | C | B | A | A | A | A |
| Image Quality Evaluation | A | B | C | B | A | A |
| Abrasion Resistance Evaluation | C | C | D | C | C | B |

TABLE 6-continued

|  | Examples | | | | |
| --- | --- | --- | --- | --- | --- |
|  | Recording Example 18 | Recording Example 19 | Recording Example 20 | Recording Example 21 | Recording Example 22 |
| Ink | Ink 1 | Ink 1 | Ink 1 | Ink 1 | Ink 1 |
| Reaction Liquid | Reaction Liquid 5 | Reaction Liquid 6 | — | Reaction Liquid 1 | Reaction Liquid 1 |
| Primary Heating Temperature (° C.) | 45 | 45 | 45 | 45 | 45 |
| Scanning Time (s) | 6 | 6 | 6 | 9 | 9 |
| Head | Head 1 | Head 1 | Head 1 | Head 2 | Head 3 |
| Reaction Liquid Surface Tension (mN/m) | 27 | 36 | — | 34 | 34 |
| Ink Surface Tension (mN/m) | 29 | 29 | — | 29 | 29 |
| Surface Tension Difference (mN/m) | −2 | 7 | — | 5 | 5 |
| Ejection Reliability | A | A | A | A | A |
| Image Quality Evaluation | A | B | D | A | A |
| Abrasion Resistance Evaluation | B | B | A | C | C |

TABLE 7

|  | Comparative Examples | | | | | | |
| --- | --- | --- | --- | --- | --- | --- | --- |
|  | Recording Example 23 | Recording Example 24 | Recording Example 25 | Recording Example 26 | Recording Example 27 | Recording Example 28 | Recording Example 29 |
| Ink | Ink 8 | Ink 9 | Ink 10 | Ink 11 | Ink 12 | Ink 13 | Ink 14 |
| Reaction Liquid | Reaction Liquid 1 | Reaction Liquid 1 | Reaction Liquid 1 | Reaction Liquid 1 | Reaction Liquid 1 | Reaction Liquid 1 | Reaction Liquid 1 |
| Primary Heating Temperature (° C.) | 45 | 45 | 45 | 45 | 45 | 45 | 45 |
| Scanning Time (s) | 6 | 6 | 6 | 6 | 6 | 6 | 6 |
| Head | Head 1 | Head 1 | Head 1 | Head 1 | Head 1 | Head 1 | Head 1 |
| Reaction Liquid Surface Tension (mN/m) | 34 | 34 | 34 | 34 | 34 | 34 | 34 |
| Ink Surface Tension (mN/m) | 33 | 28 | 31 | 30 | 32 | 28 | 33 |
| Surface Tension Difference (mN/m) | 1 | 6 | 3 | 4 | 2 | 6 | 1 |
| Ejection Reliability | D | B | D | E | E | E | D |
| Image Quality Evaluation | C | D | B | A | A | B | C |
| Abrasion Resistance Evaluation | D | E | C | B | E | C | E |

In Tables 5 to 7, the following heads were used for each head type.

Head 1: An ink jet head also having the step portion 22*a* and the retention portion 26 shown in FIG. 2. The nozzle plate 20 was obtained by etching a silicon layer to form a nozzle. The head 1 has high productivity and is suitable for mass production. In addition, the head 1 was easy to design.

Head 2: The structure is the same as the head 1. The nozzle plate 20 was obtained by mechanically drilling a metal layer to form a nozzle.

Head 3: In the ink jet head shown in FIG. 2, the position of the nozzle is provided on the left side of the drawing as compared with FIG. 2, and the distance between the nozzle and the left end of the pressure chamber is set to a distance of 2, which is half of the head 1. Compared with the head 1, the head 3 had a small ink retention portion on the left of the pressure chamber.

3.3.3. Evaluation of Abrasion Resistance

After the recorded matter obtained by the recording test described above was allowed to stand for one hour in a laboratory under the condition of being at room temperature (25° C.), the recording surface of the recorded matter was evaluated according to the following criteria by confirming a state in which the recording surface was peeled when rubbed 20 times with a cotton cloth using an AB-301 Color Fastness Rubbing Tester (trade name, manufactured by Tester Sangyo Co., Ltd.) under a load of 200 g and a state of ink transfer to the cotton cloth.

Evaluation Criteria

A: No scratches even after 30 reciprocations
B: No scratches up to 20 to 29 reciprocations
C: No scratches up to 10 to 19 reciprocations
D: No scratches up to 5 to 9 reciprocations
E: Scratches within 5 reciprocations 3.4. Evaluation Results The evaluation of the ink composition is shown in Table 3, and the results of the evaluation test of the ink jet recording method are shown in Tables 5 to 7.

In the evaluation of the ink composition shown in Table 3, in any of the Examples which contained a pigment dispersion formed of a surface-treated pigment having a phosphorus-containing group on the surface thereof and in which the conductivity of the ink composition was 2600 μs/cm or less, it was possible to secure the printing quality during fine line printing and the storage stability of the ink. Furthermore, the inks 1 and 3 to 7 having a conductivity of 2000 μs/cm or less had particularly excellent ink storage stability.

On the other hand, in the Comparative Examples, inks 11 to 13 in which the conductivity of the ink composition was more than 2600 μs/cm had inferior ink storage stability, and inks 8 to 10 and 14 having no surface-treated pigment having a phosphorus-containing group on the surface thereof tended to be inferior in the print evaluation to Examples.

In addition, in the evaluation of the ink jet recording method shown in Tables 5 to 7, in all of the Examples in which an ink which contains a pigment dispersion formed of a surface-treated pigment having a phosphorus-containing group on the surface thereof and in which the conductivity of the ink composition was 2600 μs/cm or less was used, the ejection reliability and abrasion resistance evaluation were superior. In contrast, in a Comparative Example using an ink which contains a pigment dispersion formed of a surface-treated pigment having a phosphorus-containing group on the surface thereof and in which the conductivity of the ink composition was not 2600 μs/cm or less, either one of the ejection reliability evaluation and the abrasion resistance evaluation was inferior.

Specifically, compared to Recording Example 3 in which the surface tension difference between the ink and the reaction liquid was high, Recording Example 2 in which the surface tension difference is low had superior image quality. In addition, from a comparison between Recording Examples 3 and 4 and Recording Example 1, in a case where the ink does not include glycerin, the results were that the ejection reliability was slightly inferior, but the abrasion resistance evaluation was superior. Furthermore, from the comparison between Recording Example 6 and Recording Examples 3 and 4, in the case where glycerin was not included, the Example including 2-pyrrolidone has a superior abrasion resistance evaluation to the Examples including no 2-pyrrolidone. In addition, from the comparison between Recording Example 1 and Recording Example 5, it was found that the higher the conductivity of the ink, the better the image quality and the abrasion resistance evaluation.

From the comparison between Recording Examples 1 and 15 to 19, the image quality was secured even in a case where the type of the aggregating agent was changed. In addition, in Recording Example 1, the image quality was better although the abrasion resistance evaluation was inferior compared to Recording Example 20 in which the reaction liquid was not used. From this fact, it was found that the present embodiment is particularly useful in that an excellent abrasion resistance evaluation is obtained even in a case where a better image quality is obtained using a reaction liquid. In addition, from the comparison between Recording Examples 17 to 19 and Recording Examples 1, 15, and 16, the abrasion resistance evaluation was particularly excellent when the reaction liquid included 2-pyrrolidone.

In Recording Example 12, the scanning time is lengthened as compared with Recording Example 1 and increasing the scanning time tends to lower the ejection reliability. From this fact, it was found that the present embodiment is particularly useful in that ejection stability is obtained even in a case where the scanning time is long due to the carriage speed being slow, the width of the recording medium in the scanning direction being long, or the like. From the comparison of Recording Examples 12 to 14, it was found that the lower the primary heating temperature, the lower the image quality and abrasion resistance, but that the ejection reliability is particularly excellent. From this fact, it was found that the present embodiment is particularly useful in that excellent image quality is obtained even in a case where the primary heating temperature is lowered to obtain better ejection reliability.

In Recording Example 12, the head had a structure different from that of Recording Examples 21 and 22 and it was found that the head tended to be inferior in ejection reliability, but was suitable for mass production and was easy to design. From this fact, it was found that the present embodiment is particularly useful in that ejection reliability is obtained even in a case where a head which is suitable for mass production and easy to design is used.

As described above, in a case where the ink composition contains a pigment dispersion formed of a surface-treated pigment having a phosphorus-containing group on the surface thereof and a resin dispersion, and the conductivity of the ink composition is 2600 μs/cm or less, the ink was excellent in storage stability while securing printing quality during fine line printing, and in ink jet recording using this ink, it was possible to further secure the ejection reliability and abrasion resistance evaluation.

The invention is not limited to the above-described embodiment, and various modifications are possible. For example, the invention includes configurations substantially the same as the configurations described in the embodiments (for example, configurations having the same function, method, and result, or configurations having the same object and effect). In addition, the invention includes configurations in which non-essential parts of the configurations described in the embodiments are replaced. In addition, the invention includes configurations which achieve the same operation and effect as the configurations described in the embodiments, or configurations able to achieve the same object. In addition, the invention includes configurations in which a publicly-known technique is added to the configurations described in the embodiments.

The entire disclosures of Japanese Patent Application Nos. 2017-052568, filed Mar. 17, 2017 and 2017-078680, filed Apr. 12, 2017 are expressly incorporated by reference herein.

What is claimed is:

1. An aqueous ink jet ink composition comprising:
   a pigment dispersion formed of a surface-treated pigment having a phosphorus-containing group on a surface thereof; and
   a resin dispersion,
   wherein the aqueous ink jet ink composition has a conductivity in a range of 1128 to 2600 μs/cm; and
   a content of the surface-treated pigment in the aqueous ink jet ink composition is 7% by mass or less.

2. The aqueous ink jet ink composition according to claim 1,
   wherein the phosphorus-containing group contains either a P—O group or a P=O group.

3. The aqueous ink jet ink composition according to claim 1,
wherein the conductivity is 1128 μs/cm or more and 2000 μs/cm or less.

4. The aqueous ink jet ink composition according to claim 1, further comprising:
a content of an organic solvent having a standard boiling point of 280° C. or higher that is 5% by mass or less.

5. The aqueous ink jet ink composition according to claim 1,
wherein a solid content of the resin dispersion is 1% by mass or more and 15% by mass or less.

6. The aqueous ink jet ink composition according to claim 1,
wherein the content of the surface-treated pigment is 0.5% by mass or more and 7% by mass or less.

7. The aqueous ink jet ink composition according to claim 1, wherein the aqueous ink jet ink composition has a conductivity in the range of 1524 to 2600 μs/cm.

8. The aqueous ink jet ink composition according to claim 1, wherein where a solid content of the resin dispersion is 3 to 15% by mass.

9. The aqueous ink jet ink composition according to claim 1, further comprising:
a content of an organic solvent having a standard boiling point of 280° C. or higher that is 1% by mass or less.

10. The aqueous ink jet ink composition according to claim 1, wherein a resin of the resin dispersion includes (meth)acrylic resin, polyurethane-based resin, polyester-based resin, or polyether-based resin.

11. An ink jet recording method comprising:
attaching the aqueous ink jet ink composition according to claim 1 to a recording medium by ejecting the aqueous ink jet ink composition from an ink jet head.

12. The ink jet recording method according to claim 11, further comprising:
attaching a reaction liquid including an aggregating agent for aggregating components of the aqueous ink jet ink composition to the recording medium.

13. The ink jet recording method according to claim 11, further comprising:
heating the recording medium,
wherein the attaching of the aqueous ink jet ink composition is performed on the recording medium heated in the heating.

14. The ink jet recording method according to claim 13, wherein a surface temperature of the recording medium is 30° C. or higher and 55° C. or lower in the attaching of the aqueous ink jet ink composition.

15. The ink jet recording method according to claim 11, wherein the attaching of the aqueous ink jet ink composition is performed in which scanning is performed a plurality of times for attaching the ink composition to the recording medium by ejecting the aqueous ink jet ink composition from the ink jet head while the ink jet head changes position relative to the recording medium, and
a scanning time for one scan is 12 s or shorter.

16. The ink jet recording method according to claim 12, wherein an absolute value of a difference in surface tension between the aqueous ink jet ink composition and the reaction liquid is 10 or less.

17. The ink jet recording method according to claim 12, wherein the reaction liquid contains 5% by mass or less of a water-soluble organic solvent having a standard boiling point of higher than 280° C.

18. The ink jet recording method according to claim 11, wherein the ink jet head has a step portion in a flow path through which the aqueous ink jet ink composition passes between a pressure chamber and a nozzle.

* * * * *